(12) United States Patent
Curson

(10) Patent No.: US 11,525,234 B2
(45) Date of Patent: Dec. 13, 2022

(54) GEOGRIDS

(71) Applicant: Tensar Technologies Limited, Blackburn (GB)

(72) Inventor: Andrew Curson, Burnley (GB)

(73) Assignee: TENSAR TECHNOLOGIES LIMITED, Blackburn (GB)

( * ) Notice: Subject to any disclaimer, the term of this patent is extended or adjusted under 35 U.S.C. 154(b) by 0 days.

(21) Appl. No.: 16/648,379

(22) PCT Filed: Sep. 19, 2018

(86) PCT No.: PCT/GB2018/052670
§ 371 (c)(1),
(2) Date: Mar. 18, 2020

(87) PCT Pub. No.: WO2019/058113
PCT Pub. Date: Mar. 28, 2019

(65) Prior Publication Data
US 2020/0283985 A1   Sep. 10, 2020

(30) Foreign Application Priority Data

Sep. 20, 2017 (GB) .................................. 1715202

(51) Int. Cl.
*E02D 17/20* (2006.01)
*E02D 3/00* (2006.01)
(Continued)

(52) U.S. Cl.
CPC ......... *E02D 29/0241* (2013.01); *B29D 28/00* (2013.01); *E02D 17/202* (2013.01);
(Continued)

(58) Field of Classification Search
CPC .............. E02D 17/202; E02D 2200/00; E02D 2200/13; E02D 2250/00; E02D 2300/0084;
(Continued)

(56) References Cited

U.S. PATENT DOCUMENTS 3,666,609 A    5/1972  Kalwaites et al.
4,013,752 A *  3/1977  Kalwaites ............. B29C 55/146
                                                    264/154

(Continued)

FOREIGN PATENT DOCUMENTS

CN        1069225      2/1993
CN       101691748     4/2010
(Continued)

OTHER PUBLICATIONS

Eurasian office action and English-language translation.
Japanese office action and English-language summary.

*Primary Examiner* — Benjamin F Fiorello
*Assistant Examiner* — Stacy N Lawson
(74) *Attorney, Agent, or Firm* — Jacobson Holman PLLC

(57) ABSTRACT

A geogrid in the form of an integral, mesh structure includes molecularly orientated polymeric material, with the integral, mesh structure being formed of interconnecting mesh defining elements including elongate tensile elements. The molecular orientation of the integral, mesh structure is uniform throughout the extent thereof.

52 Claims, 8 Drawing Sheets

(51) Int. Cl.
 B29D 28/00 (2006.01)
 E02D 29/02 (2006.01)
(52) U.S. Cl.
 CPC ...... *E02D 29/0208* (2013.01); *E02D 2200/00* (2013.01); *E02D 2200/13* (2013.01); *E02D 2250/00* (2013.01); *E02D 2300/0006* (2013.01); *E02D 2600/40* (2013.01)
(58) Field of Classification Search
 CPC ............ E02D 29/0208; E02D 29/0241; E02D 29/025; E02D 29/202; E02D 2300/0006; E02D 2600/40; B29D 28/00; Y10S 428/91
 See application file for complete search history.

(56) References Cited

U.S. PATENT DOCUMENTS

| | | | |
|---|---|---|---|
| 4,374,798 A | 2/1983 | Mercer | |
| 4,680,215 A * | 7/1987 | Mercer | B32B 3/26 428/107 |
| 5,269,631 A | 12/1993 | Mercer et al. | |
| 7,048,984 B2 * | 5/2006 | Seth | A44B 18/0053 24/452 |
| 2010/0201024 A1 * | 8/2010 | Gibson | A61F 13/15731 264/156 |
| 2010/0254771 A1 * | 10/2010 | Tyagi | B29D 28/00 405/302.7 |
| 2011/0277692 A1 | 11/2011 | Lindgren | |
| 2013/0115415 A1 * | 5/2013 | Walsh | B32B 3/266 428/131 |

FOREIGN PATENT DOCUMENTS

| | | |
|---|---|---|
| EP | 0374365 | 6/1990 |
| GB | 1245842 | 9/1971 |
| GB | 1310474 | 3/1973 |
| GB | 2035191 | 10/1979 |
| GB | 2391832 | 2/2004 |
| JP | H0299318 | 4/1990 |
| JP | H04-216925 A | 8/1992 |
| JP | H06182897 | 7/1994 |
| JP | H07173824 | 7/1995 |
| JP | 2000043141 | 2/2000 |
| KR | 100536737 | 12/2005 |
| WO | WO2004/003303 | 1/2004 |
| WO | WO2009/102475 | 8/2009 |
| WO | WO2013/061049 | 5/2013 |

\* cited by examiner

SECTION ON A-A

SECTION ON B-B

GEOGRIDS

BACKGROUND OF THE INVENTION

Field of the Invention

The present invention relates to geogrids in the form of mesh structures which comprise molecularly oriented polymers to provide improved characteristics of the geogrid, such as improved strength and/or stiffness.

Description of Related Art

Geogrids are high tensile strength mesh structures used to stabilise or reinforce particulate material (e.g. soil or aggregate) in geoengineering constructions. More particularly, the geogrid is embedded in the particulate material of the construction so that this material can then lock into the open meshes of the geogrid. Geogrids can be manufactured in many different ways, for example by stitch bonding fabrics made of, for instance, polymer filaments and applying a flexible coating such as PVC or bitumen, or by weaving or by knitting, or even joining oriented plastic strands together (e.g. by the application of mechanical fixings, adhesives or welding processes).

It is also known that geogrids can be produced by stretching a plastic sheet of polymeric starting material (polymeric starting sheet) which has been provided (e.g. by punching) with an array of holes (e.g. on a rectangular, or other suitable grid pattern). Stretching the polymeric starting sheet produces a geogrid in the form of a mesh structure comprised of mesh defining elements including elongate tensile elements and also junctions, the tensile elements being interconnected at least partly by the junctions. Such geogrids are often referred to as punch and stretch geogrids. In the production of geogrids by this process, the stretching operation draws out polymer in the stretch direction into the form of elongate tensile elements with consequential enlargement of the holes in the original sheet starting material to produce the final mesh structure (i.e. the geogrid). The stretching operation provides molecular orientation of the polymer (in the stretching direction) in the elongate tensile elements and also (but to a lesser extent) in the junctions. The degree of orientation may be represented by the stretch ratio which is the ratio of the distance between two points on the surface of the geogrid as compared to the distance between the corresponding points on the sheet starting material (i.e. prior to stretching). It is the molecular orientation that provides the required characteristics for the geogrid (since molecularly oriented polymer has considerably higher strength and stiffness in the stretch direction than non-oriented polymer). The molecular orientation is irreversible under normal temperature conditions, to which the geogrid is exposed after its manufacture, e.g. during storage transport and use.

Geogrids produced by stretching apertured, polymeric starting sheets may be uniaxially or biaxially oriented. In the case of a uniaxially oriented ("uniax") geogrid, stretching has been effected in only a single direction, whereas a biaxially oriented ("biax") geogrid has been produced by employing two stretching operations transverse to each other in the plane of the sheet starting material, these operations usually being perpendicular to each other and generally effected sequentially (but can be effected simultaneously with the appropriate equipment known within the industry). Such techniques for producing uniax and biax mesh structures by stretching an apertured, polymeric starting sheet in one direction (for a uniax product) or two directions (for a biax product) are disclosed, for example, in GB 2035191 (equivalent to U.S. Pat. No. 4,374,798 and EP 0374365). Further examples of geogrids are shown in WO 2004/003303 and WO 2013/061049.

In the manufacture of uniax and biax geogrids, the apertured polymeric starting sheet is usually elongate (and in the form of an unoriented web) and is initially stretched in the length direction. For the purpose of producing a uniax geogrid, this will be the sole stretching operation. In the case of a biax geogrid, the web is also stretched in the transverse direction. This transverse stretching is usually carried out subsequent to the longitudinal stretching (although may be carried out simultaneously) and is usually perpendicular to the longitudinal stretching.

Conventional uniax geogrids are produced by stretching an elongate apertured polymeric starting sheet in the length direction and comprise:

(a) a plurality of generally parallel (and transversely spaced) rib structures extending in the stretch direction, and (b) a plurality of generally parallel (and longitudinally spaced) bar structures extending transversely (usually perpendicularly) to the rib structures, the rib structures and bar structures being interconnected by junctions at spaced locations along their respective lengths whereby the rib structures are sub-divided along their length into alternating junctions and rib segments (forming elongate, molecularly oriented tensile elements of the mesh structure) and the bar structures are sub-divided along their length into alternating bar segments and junctions.

Considering the production of conventional uniax geogrids in more detail, the array of holes in the polymeric starting sheet is generally configured to be comprised of first rows of holes extending in a first direction and second rows of holes extending in a second direction which is transverse (and generally perpendicular) to the first direction. In the production of the uniax geogrid, the polymeric starting sheet is stretched parallel to the first direction. This results in the formation of the aforementioned rib structures from areas of the starting sheet between adjacent first rows of holes and formation of the bar structures from areas of material between adjacent second rows of holes.

Conventional uniax grids are extensively used in applications where the stress is primarily in one direction, for instance when reinforcing slopes, embankments or modular block, panel and other designs of retaining walls. In such structures, stresses are transferred from the particulate material being reinforced along the rib structures and into the bars. It is, of course, the molecular orientation of the rib segments (i.e. the tensile elements) along their lengths which render uniax geogrids suitable for use in reinforcement applications where the stress is primarily in one direction.

Typically, uniax geogrids are such that, as determined in the length direction of a rib structure, the stretch ratio at the mid-point of a rib segment is about 8:1. Typically also the bar segments in a conventional uniax geogrid have a width of from 16 mm to 20 mm as measured in a direction parallel to the length of the rib structures, and are comprised of substantially unoriented polymer. More specifically, the polymer is substantially unoriented along the length and width of the bar segments and is similarly so at the junctions when considered both along the length of the rib structure and the length of the bar structure. It will be appreciated that the weight of unoriented polymer in the transverse bar structure can represent a significant percentage of the overall weight of the uniax geogrid. Thus when one considers that the most efficient use of polymer in geogrids is that which is oriented in the strands (as this provides increased mechanical properties and reduced weight) it will be appreciated that the relatively significant amount of unoriented polymer in the bar structures (bar segments and junctions) provides for a lowering of the efficiency of the geogrid.

WO 2013/061049 relates to a development of uniax geogrids produced by stretching an apertured polymeric starting sheet. In the uniax geogrids produced in accordance with WO 2013/061049 the orientation of the rib segments extends (albeit to a lower degree) across the junctions. Embodiments are disclosed in which the stretch ratio at the mid-point of the rib segments (measured in the stretching direction) is about 9:1 and the stretch ratio at the mid-points of the junctions (again as measured in the stretching direction) is about 5:1 to 6:1. Thus the rib structures have a significant degree of orientation along their length (with the orientation being a maximum at the mid-points of the lengths of the rib segments and a minimum at the mid-points of the junctions). Uniax geogrids produced in accordance with WO 2013/061049 provide an improvement over the uniax geogrids discussed in the previous paragraph but nevertheless (as indicated) the orientation at the mid-point of the junctions is still lower than that at the mid-point of the rib segments (when considered in the length direction thereof). Furthermore, all of the uniax geogrids described above (including those produced in accordance with WO 2013/061049) have bar segments (between the junctions) which are relatively much thicker than the rib segments. The regions of the original polymeric starting sheet that form the bar segments remain unstretched (or at least substantially so) and therefore are effectively of the same thickness as the original starting sheet. The bar segments therefore incorporate unoriented polymer which is disadvantageous as the unoriented polymer does not contribute significantly to improving the strength of the geogrid which is inefficient as a proportion of the polymer does not enhance the desired geogrid properties. For uniax geogrids such desired properties include short-term tensile strength and the percentage of the short-term tensile strength that is available to provide the long-term 'creep' performance of the product (or lifetime under a sustained load). Creep performance may be expressed in terms of a Creep Reduction Factor ($RF_{CR}$) which may be determined in accordance with PD ISO TR 20432/2007 on the basis of static creep tests in accordance BS EN ISO 13431/1999 and stepped isothermal method creep testing in accordance with ASTM D6992/03. Establishing creep performance is an especially useful factor in determining the long term strength of a geogrid intended for soil reinforcement.

Prior art uniax geogrids in the form of integral mesh structures have a Creep Reduction Factor of around 50%. Improvement in this performance is desirable.

Furthermore, in uniax geogrids, the relatively thick bar segments are a hindrance to "stacking" of sheets (i.e. the use of multiple layers of the same (or different) strength uniax geogrid to provide increased strength options). Additionally the thick bar segments are a hindrance to winding of the uniax geogrids into rolls.

The presence of thickened junctions is also a feature of biax geogrids in the form of integral mesh structures produced by stretching an apertured polymeric starting sheet.

SUMMARY OF THE INVENTION

It is therefore an object of the present invention to obviate or mitigate the abovementioned disadvantages.

According to a first aspect of the present invention there is provided a geogrid which is in the form of an integral mesh structure comprising, preferably consisting essentially, more preferably consisting of, molecularly orientated polymeric material, the mesh structure formed of inter-connecting mesh defining elements including elongate tensile elements wherein the molecular orientation of the polymeric material of the mesh structure is uniform throughout the extent thereof.

Optionally the mesh structure is plastic. Plastic materials are pliable, capable of being shaped, deformed or moulded, as energy is supplied to them by heating and/or mechanical processes such as stretching and/or (co)extrusion. It is preferred the polymeric material that is used to form the geogrids of the invention exhibits plastic properties at least during the process of making the geogrid.

Uniform and/or uniformly as used herein (for example in relation to uniformly molecularly orientated and/or uniform thickness) encompass substantially uniform as defined quantitatively herein with uniform being preferred at 100% of the desired or mean value (e.g. of orientation as measured by MD stretch ratio and/or of mesh thickness in mm).

According to a second aspect of the present invention there is provided a method of producing a geogrid comprising the steps of:

(a) stretching an elongate sheet comprising, preferably consisting essentially, more preferably consisting of, a polymeric starting material in at least a first direction to form a geogrid precursor in the form of a sheet that has uniformly molecularly oriented polymeric material throughout its extent, and (b) converting the geogrid precursor into a geogrid by forming apertures in the geogrid precursor to define an integral mesh structure formed of interconnected mesh defining elements including elongate tensile elements, whereby the molecular orientation of the polymeric material of the geogrid is uniform throughout the extent thereof.

Molecular orientation (such as uniform molecular orientation) of polymeric material within a geogrid may be determined by many techniques well known in the art. A skilled person would understand that the molecular orientation within a polymeric material is an inherent intrinsic property of the material arising from increased alignment of the polymeric material whether alignment of polymer chains when an amorphous polymer is stretched in the direction of orientation and/or due to alignment of polymer chains and/or polymer crystalline regions when a semi-crystalline or crystalline polymer is stretched in the direction of orientation. Thus degree of orientation of a polymeric material measured in any direction and however defined (e.g. by a draw or stretch ratio) does not require knowledge of the process by which the polymeric material was made as it is an inherent, measureable property of the material derivable from the material alone. Suitable techniques for measuring polymer orientation may include but are not limited to any of the following: X-ray diffraction, attenuated total reflection (ATR) by Fourier transform infra-red (FT-IR) spectroscopy, birefringence, sonic modules, polarized fluorescence, broad line NMR, UV and infrared dichroism, polarized spectroscopy; and/or shrinkage reversion. XRD and/or shrinkage reversion are particularly suitable for determining molecular orientation of polymers in geogrids given geogrids are thicker than many polymeric films prepared for other uses and are typically opaque to some radiation as geogrids often having UV absorbers such as carbon black dispersed therein. A non-limiting example of a particularly preferred, practical test for determining polymer orientation of the geogrids of the present invention is the shrinkage reversion test described herein. This provides a quick, simple check that can be readily performed to obtain a reasonably accurate degree of orientation of the polymers within 2% of the true value, which for geogrids is sufficient for most circumstances. A skilled person would appreciate and select another of the many known tests if a higher accuracy was desired.

A shrinkage reversion test to determine the degree of molecular orientation present in a sample may be usefully performed as follows. A sample of oriented polymer is heated at a sufficiently high enough temperature for a sufficiently long enough time to revert to a completely relaxed state where the polymer chains (and/or polymer crystal domains if the polymer is crystalline or semi-crystalline) are amorphous and not oriented in any direction. After heating the sample will thus have contracted (or reverted) to its state before orientated and thus the ratio of the sample before and after reversion provides the draw ratio. The heat temperature will depend on the specific polymer or polymer mixture tested but will typically be close to its melting point (e.g. within 10° C., preferably within 5° C.). The duration of heating in this test is preferably until no further shrinkage is observed. A specific example of this test is shown in FIG. 8 and described in Example 5.

The invention is a departure from prior integral polymeric geogrids in that the geogrid of the invention is uniformly molecularly oriented throughout its extent. In contrast, prior integral polymeric geogrids are such that the polymer molecular orientation varies throughout the geogrid (e.g. being different as between junctions and tensile elements and also varying along the tensile elements and across the junctions). Uniform molecular orientation of polymer throughout the geogrid of the invention provides considerable improvement in the efficiency with which polymer is used and leads to geogrids with improved properties (particularly tensile strength and creep resistance) compared to prior geogrids. The uniform molecular orientation of geogrids of the invention can be obtained by forming the geogrid from a geogrid precursor (which has uniformly molecularly oriented polymers) by forming apertures e.g. by punching in the precursor to define the geogrid. The geogrid precursor itself is obtained by stretching a polymeric starting sheet in at least one direction so as to impart molecular orientation and form the geogrid precursor.

There is the further advantage in that geogrids in accordance with the first aspect of the invention may be of essentially uniform thickness resulting from the fact that the polymeric starting sheet may itself be of essentially uniform thickness, as may the geogrid precursor (produced by stretching) in which the apertures are formed. By "essentially uniform thickness" in the context of a geogrid we mean that apart from any thickening along one or more edges of the geogrid (usually resulting from the process by which the geogrid is produced and ideally being trimmed-off for the purpose of a commercially acceptable product) the geogrid is of uniform thickness (or substantially uniform thickness as defined herein) over the remainder of its area save for (a) any localised variation caused by optional surface profiling, and/or (b) small distortion around aperture peripheries (e.g. "pressure marks", discussed below) resulting from the process that introduces the apertures.

Any edge thickening at one or more edges of the geogrid will extend in the longitudinal direction of the geogrid and the width (of any such thickened region) is likely to be less than 5% of the overall width of the geogrid. As indicated above, thickened edges may be removed from the final product.

By "essentially uniform thickness" of the geogrid precursor we mean the same as in the case of the geogrid save that (b) is not a feature of the geogrid precursor. By "essentially uniform thickness" in the context of the sheet starting material, we mean that the sheet is of uniform thickness save for any localised variation caused by optional surface profiling.

Thus, the mesh defining elements of the geogrid may be of essentially the same thickness. Therefore there are substantially no, preferably no, thickened regions of the geogrid containing unoriented polymer (or polymer oriented somewhat less than the tensile elements) that does not significantly contribute to the strength of the product. Furthermore, the essentially flat nature of the geogrid is a considerable advantage in terms of handling sheets of the geogrid, particularly facilitating "stacking" thereof (see above). The relatively uniform thickness of the geogrid also allows lateral joining of grids to provide width variations. Additionally, there is the ability to more easily wrap the geogrid around connectors, facings or other ancillary components used in the structures. Finally, the relatively uniform thickness facilitates production of smaller diameters of rolls of the geogrid, which improve transport efficiency.

This leads to a third aspect of the invention according to which there is provided a geogrid in the form of an integral, molecularly oriented plastics mesh structure comprising elongate tensile elements interconnected by junctions in the mesh structure wherein the junctions and the elongate tensile elements have the same mean thickness.

According to a fourth aspect of the present invention there is provided a method of producing a geogrid comprising the steps of:

(a) stretching an elongate starting sheet comprising, preferably consisting essentially, more preferably consisting of, polymeric material in at least a first direction to form a geogrid precursor in the form of a sheet that is of uniform thickness, and (b) converting the geogrid precursor into a geogrid by forming apertures in the geogrid precursor to define an integral mesh structure comprising elongate tensile elements interconnected by junctions in the mesh structure, whereby the junctions and the elongate tensile elements are of uniform thickness.

Preferred geogrids of the invention are in accordance with the first and third aspects of the invention, i.e. the geogrids have polymers with uniform molecular orientation throughout the extent thereof and comprise elongate tensile elements connected by junctions which have the same mean thickness as the tensile elements.

Expressed alternatively, and provided as a fifth aspect, the invention provides a geogrid which is in the form of an integral, mesh structure comprising, preferably consisting essentially, more preferably consisting of, polymeric material, the mesh structure comprising elongate tensile elements interconnected by junctions in the mesh structure wherein there is substantially no thickening, preferably no thickening of the junctions caused by a stretching process by which the geogrid has been produced.

A geogrid in accordance with the invention may be a uniax geogrid and may have a Creep Reduction Factor ($RF_{CR}$) determined in accordance with PD ISO/TR 20432:2007 on the basis of Static Creep Tests in accordance with BE EN ISO 13431:1999 and Stepped Isothermal Method creep testing in accordance with ASTM D6992-03 of at least 55%, more preferably at least 60%, even more preferably at least 65%, and most preferably at least 70%.

This leads to a sixth aspect of the invention according to which there is provided a geogrid which is in the form of an integral, mesh structure comprising, preferably consisting essentially, more preferably consisting of, molecularly oriented polymeric material which is uniaxially oriented and where the geogrid has a Creep Reduction Factor ($RF_{CR}$) determined in accordance with PD ISO/TR 20432:2007 on the basis of Static Creep Tests in accordance with BE EN ISO 13431:1999 and Stepped Isothermal Method creep testing in accordance with ASTM D6992-03 of at least 55%, more preferably at least 60%, even more preferably at least 65%, and most preferably at least 70%.

Preferably the geogrid precursor from which the geogrid is manufactured is elongate and has been produced by stretching an elongate polymeric starting sheet in the length direction of the sheet (whereby the first direction is along the length of the sheet and correspondingly along the length of the geogrid precursor). The stretching in the length direction of such a starting sheet may be the only stretching operation effected or it may be one of multiple stretching operations in different directions. The invention is therefore applicable to both uniaxially and biaxially oriented geogrids.

Polymeric material usefully denotes a material comprising, preferably consisting essentially, more preferably consisting of, one or more polymers which have a sufficiently high molecular weight to provide the desired properties (e.g. strength and/or stiffness) to the geogrid of use in applications described herein but are also preferably sufficiently plastic to be capable of being processed by the application heat, pressure, and/or mechanical working to be oriented as described herein. Various polymeric materials may be used for the polymer starting sheet (and therefore the geogrid precursor element) and non-limiting examples of suitable polymers are described herein which polymers may be plastic, preferably thermoplastic.

Non-limiting examples of polymers suitable for use in preparing a mesh of the present invention are polyolefins [e.g. polypropylene and/or polyethylene] polyurethanes, polyvinylhalides [e.g. polyvinyl chloride (PVC),], polyesters [e.g. polyethylene terephthalate—PET], polyamides [e.g. nylons].and/or non-hydrocarbon polymers). Even more preferred polymers are High Density Polyethylene (HDPE), polypropylene (PP), and polyethylene terephthalate (PET) with HDPE being a most preferred polymer.

Conveniently the polyolefin sheet starting material may comprise one or more polyolefins [e.g. polypropylene homopolymer, polyethylene homopolymer (e.g. high density polyethylene—HDPE) and/or polypropylene/polyethylene copolymer(s); optionally in one or more layers]. The constituent polymers and/or layers in a sheet may be oriented, blown, shrunk, stretched, cast, extruded, co-extruded and/or comprise any suitable mixtures and/or combinations thereof. Sheets may optionally be crosslinked by any suitable means such as electron beam (EB) or UV crosslinking, if necessary by use of suitable additives in the sheet.

Polymers such as resins used to produce the polymeric starting sheets are generally commercially available in pellet form and may be melt blended or mechanically mixed by well-known methods known in the art, using commercially available equipment including tumblers, mixers and/or blenders. The polymers may have other additional polymers or resins blended therewith along with well-known additives such as processing aids and/or colorants. Methods for producing polyolefin sheets are well-known and include the technique of extruding sheets through slit dies.

For example to produce a polymeric sheet the polymers and additives are introduced into an extruder where the polymers are melt plasticized by heating and then transferred to an extrusion die for formation into a sheet. Extrusion and die temperatures will generally depend upon the particular polymer being processed and suitable temperature ranges are generally known in the art or provided in technical bulletins made available by polymer manufacturers. Processing temperatures may vary depending upon process parameters chosen.

A polymeric starting sheet may be oriented by stretching at a suitable temperature depending on its constituent polymer(s). The resultant oriented sheet may exhibit greatly improved tensile and stiffness properties. Orientation may be along one axis if the sheet is stretched in only one direction, or may be biaxial if the sheet is stretched in each of two mutually perpendicular directions in the plane of the sheet. A biaxial oriented sheet may be balanced or unbalanced, where an unbalanced sheet has a higher degree of orientation in a preferred direction, usually the transverse direction. Conventionally the longitudinal direction (LD) is the direction in which the sheet passes through the machine (also known as the machine direction or MD) and the transverse direction (TD) is perpendicular to MD. Preferred biax sheets are oriented in both MD and TD.

The original polymeric starting sheet may for example have a thickness of 2 to 12 mm, more preferably 4 to 10 mm, and even more preferably 4 to 9 mm. A particularly suitable thickness for the polymeric starting sheet is about 6 mm.

Orientation of the sheet may be achieved by any suitable technique. For example a flat sheet may be oriented by simultaneous or sequential stretching in each of two mutually perpendicular directions by means of a stenter, or by a combination of draw rolls and a stenter. The degree to which the sheet is stretched depends to some extent on the ultimate use for which the sheet is intended, but satisfactory tensile and other properties are generally developed when the sheet is stretched in the ratios described herein. In stretching of the polymeric starting sheet to form the geogrid precursor (which is subsequently apertured to form the geogrid), the stretch ratio may for example in one embodiment be at least 4:1, in another embodiment be at least 5:1, and in a further embodiment be at least 7:1. Generally, the stretch ratio will not exceed 12:1. The stretch ratio will however depend on a number of factors, e.g. the type of polymer being used, the initial thickness of the polymeric starting sheet, and whether a uniaxially oriented or biaxially oriented geogrid is to be produced. Purely by way of non-limiting example, for the case where the polymeric starting sheet comprises HDPE the maximum stretch ratio will generally be about 10:1. In contrast, the stretch ratio will generally be a maximum of about 4:1 when the polymer is PET.

After stretching, the polymeric starting sheet may be heat-set, while restrained against shrinkage or even maintained at constant dimensions, at a suitable temperature. The optimum heat-setting temperature can readily be established by simple experimentation. Conveniently a sheet may be heat-set at temperatures in the range from about 100° C. to about 160° C. Heat-setting may be affected by conventional techniques for example by means one or more of the following: a stenter system; one or more heated rollers and/or a constrained heat treatment.

Stretch ratios as referred to herein are as measured cold after releasing the stretching force (and after any annealing is carried out), the stretch ratio being measured on the surface of the geogrid. It will be understood, as described in more detail herein, that stretch ratio is an inherent property of an orientated polymeric starting sheet and/or orientated polymeric mesh of the invention and can be determined from the sheet or mesh alone without reference to the conditions of the orientation process.

Geogrids in accordance with the invention may be uniaxially or biaxially oriented.

In preferred embodiments of the invention the elongate tensile elements are "ribbon-like" in that they have a width (measured across the major face of the geogrid) which is greater than their depth (as represented by the thickness of the geogrid), with both the width and depth being significantly less than the length. It is preferred that the cross-section of the tensile elements is uniform along their length. It is particularly preferred that the elongate tensile elements are of uniform rectangular cross-section along their lengths.

In embodiments of the invention, the elongate tensile elements are not "filaments" in that they are not fine threads or fibrils wherein their width (measured across the major face of the geogrid) is substantially the same as their depth (as represented bu the thickness of the geogrid). In embodiments, the elongate tensile elements are not of uniform elliptical or circular cross-section along their lengths.

The invention is particularly applicable to, and to the production of, uniax geogrids in which the stretching in the first direction is the only stretching applied during production of the geogrid precursor. Uniax geogrids produced in accordance with the invention preferably comprise (a) a plurality of generally parallel rib structures providing elongate tensile elements and extending in the first direction (i.e. the direction in which the polymeric starting sheet was stretched to produce the geogrid precursor element), and (b) a plurality of connector elements (integral with the rib structures) each serving to connect adjacent rib structures together, the connector elements connecting any two adjacent rib structures being longitudinally spaced from each other in the direction of the rib structures.

In accordance with the first aspect of the invention, such a geogrid may be uniformly molecularly oriented throughout the extent thereof. Further, the connectors may be arranged as a plurality of sets in which the connectors of any one set are aligned with each other (in a direction transverse to the rib structures) and the sets are spaced from each other in the longitudinal direction of the rib structures.

A preferred geogrid in accordance with the third aspect of the invention comprises:

(a) a plurality of generally parallel rib structures extending in the first direction (i.e. the direction in which the polymeric starting sheet was stretched to produce the geogrid precursor element), and b) a plurality of spaced, generally parallel bar structures extending transversely (preferably perpendicularly) to the rib structures, said rib structures and said bar structures being interconnected by junctions at spaced locations along their respective lengths whereby the rib structures are sub-divided along their lengths into alternating junctions and rib segments and the bar structures are sub-divided along their lengths into alternating bar segments and junctions.

In such a construction of uniax geogrid which incorporates the features of the first and third aspects of the invention, there is the advantage that (when considered in the first direction) orientation of the polymer does not vary along the length of the rib structures as in the case of prior uniax geogrids where (as considered in the stretch direction) orientation is at a maximum at the centre of the rib segments and falls off between adjacent such centres with the minimum being at the centre of the junctions. There is the further advantage that the geogrid is of essentially uniform thickness since all regions of the geogrid have been stretched to the same extent. Therefore there are no thicker bar segments containing unoriented polymer that does not significantly contribute to the strength of the geogrid. Furthermore, the essentially flat nature of the geogrid is a considerable advantage in terms of handling sheets of the geogrid, particularly facilitating vertical and lateral geogrid combinations thereof for increased property and dimensional flexibility.

The rib structures may be "ribbon-like" in the sense that they are generally flat with a length considerably greater than their width and depth. In preferred constructions of such uniax geogrids, the rib structures are of indefinite length and have a width of 2 to 50 mm (preferably 2 to 20 mm). The apertures in the uniax geogrid may for example have a length of 40 to 400 mm (preferably 50 to 200 mm) and a width of 5 to 100 mm (preferably 5 to 50 mm). The connector elements may have a width (as measured in the longitudinal direction of the rib structures) of 2 to 20 mm).

Usefully the width of the elongate tensile elements in any geogrid of the present invention may be from 2 to 50 mm, and in one embodiment more preferably from 5 to 40 mm, most preferably from 10 to 20 mm or in another embodiment optionally from 2 to 20 mm.

Preferably the width of the connector elements in any geogrid of the present invention may be from 2 to 20 mm, more preferably from 6 to 18 mm, most preferably from 10 to 15 mm.

Conveniently the depth (thickness) of the elongate tensile elements and/or the connector elements in any geogrid of the present invention may be from 0.1 to 3 mm, more preferably from 0.2 to 2.5 mm, even more preferably from 0.2 to 2 mm, most preferably from 0.4 to 2 mm.

Usefully the length of the aperture elements in any geogrid of the present invention may be from 40 to 300 mm, more preferably from 40 to 250 mm, most preferably from 50 to 200 mm.

Advantageously the width of the aperture elements in any geogrid of the present invention may be from 5 to 80 mm, and in one embodiment more preferably from 10 to 80 mm, even more preferably from 20 to 75 mm, most preferably from 25 to 70 mm or in another embodiment optionally from 5 to 50 mm.

In some preferred embodiments the aperture length is greater than the aperture width.

Typically a uniax geogrid in accordance with the invention will have a mean thickness of from 0.1 to 3 mm, more preferably from 0.2 to 2.5 mm, even more preferably from 0.2 to 2.2 mm, most preferably from 0.4 to 2 mm.

The stretch ratio (in the first direction) of the uniax geogrid and correspondingly the stretch ratio of both the rib structures and the connector elements (in the first direction) may for example be at least 4:1, preferably at least 5:1, more preferably at least 7:1. Generally, the stretch ratio will not exceed 12:1, more preferably will not exceed 10:1. Thus the geogrid may have a stretch ratio (in the first direction) of 4:1 to 12:1, preferably 5:1 to 10:1, and more preferably 7:1 to 10:1. However it will be appreciated that these ratios are non-limiting and by way of example only, as the stretch ratios that are achievable for any particular geogrid are dependent on the specific polymer used.

The uniax geogrid may, for example, have a tensile strength of at least 30 kN/m. Tensile strengths of geogrids as quoted herein are determined in accordance with BS EN ISO 10319:2015, which test defines tensile strength of a geosynthetic as the maximum force per unit width observed during a test in which the specimen is stretched to rupture expressed in units of kN/m. For convenience and simplicity tensile strength of geogrids may also be quoted in units of kN in which case the value of tensile strength will be assumed to correspond to that obtained for a geogrid of 1 m width tested in ISO 10319:2015.

Generally, the tensile strength of the uniax geogrid will be at least 30 kN/m. Variation in tensile strength may be achieved in a number of ways, e.g. by varying the thickness of the geogrid, the polymer from which it is manufactured, or the lateral spacing and/or width of the rib tensile elements, or the stretch ratio of the pre-cursor.

Usefully an optional advantage of the geogrids of the present invention is high strength efficiency i.e. strength for a given amount of material (e.g. measured by weight), where generally a geogrid is stronger compared to an un-oriented polymeric sheet (or web) of the same weight. It is thus possible that a continuous polymeric web of the same exterior dimensions as a geogrid made from the same polymer (which web may contain much more material) may have a higher tensile strength than the geogrid. Nevertheless a continuous sheet would be impractical, too expensive and ineffective for use as described herein as for example the geogrid apertures have a practical function of interlocking with soil particulates in use.

Whilst uniax geogrids represent a particular preferred embodiment, the invention is not limited to such (uniax) geogrids. It is possible for the stretching operation of the polymeric starting sheet to be effected in two transverse directions. These directions may be perpendicular to each other. The geogrid formed from the biaxially stretched polymeric starting sheet (i.e. the geogrid precursor) may be formed so as to comprise a plurality of sets of the elongate tensile elements of molecularly oriented polymer with the elements of each set extending in different directions to each other and being interconnected at junctions which are of the same thickness as the tensile elements. The resulting biaxially oriented geogrid may, for example, comprise first and second sets of the tensile elements of molecularly oriented polymer, the elements of the first and second sets extending perpendicularly to each other. Thus, such a structure may be produced by forming square or rectangular apertures in the geogrid precursor to provide rib structures (tensile elements) extending in two perpendicular directions. It is not however essential that the apertures be square and other configurations are possible, e.g. triangular, or hexagonal. The apertures may, for example, be formed in the geogrid precursor to define a geogrid having a structure based on that disclosed in WO 2004/00303 and comprising:

(i) a first set of substantially straight oriented strands extending at an acute angle to a first direction;

(ii) a second set of substantially straight oriented strands extending at an acute angle to the first direction and, as considered in a second direction at right angles to the first direction, alternate (angled) strands of the two sets being angled to the first direction by substantially equal and opposite angles;

(iii) further substantially straight oriented strands extending in said second direction; and (iv) junctions each interconnecting four of the angled oriented strands and two of the further oriented strands.

The invention is however applicable to all geogrid structures disclosed in WO 2004/00303, the subject matter of which is thereby here incorporated by reference.

In the biaxial stretching operation for forming the geogrid precursor element, the stretches in the two transverse (e.g. perpendicular) directions may be equal or different. The stretch ratio in either direction may be not less than 1.5:1, and is preferably from 3:1 to 6:1.

Biaxially oriented geogrids produced in accordance with the invention may have a minimum tensile strength of 10 kN/m in one direction and the same or higher minimum tensile strength in the other direction in which the sheet starting material was stretched.

In preferred embodiments of the invention, apertures of the geogrid are associated with a thin, integral bead that extends at least partly around the aperture on a face of the geogrid and projects perpendicularly (or at least generally perpendicularly) from that face. Such beads are useful in preventing fracturing (e.g. tearing) of regions of the geogrid between the elongate tensile elements (e.g. across junctions or connectors). The beads are particularly useful in the case of uniax geogrids with elongate apertures extending parallel to the direction of molecular orientation. In this case, the beads may be provided around opposite ends of the apertures but not to any substantial extent along their elongate sides. The beads may have a maximum height at the ends of the apertures and to the extent they (the beads) extend to the elongate sides may feather down to zero height before extending any distance along the sides. Typically the beads will have a height of from 0.15 to 0.30 mm and a width from 0 (i.e. no bead) up to 2.0 mm, preferably of from 0.01 to 2.0 mm.

Typically also the beads will only be provided on one face of the geogrid.

The beads may be formed as so-called "pressure marks" as described more fully later. It will be appreciated that the dimensions of the pressure mark, especially the depth, will be tiny compared to the element on which the mark is made, i.e. the mark dimensions form a low percentage of, preferably less than or equal to 10%, preferably 8%, more preferably 5% of the respective corresponding dimension of the geogrid element on which the mark is formed. The corresponding dimensions that may be compared may include mark width versus element width, mark length versus element length, mark depth versus element thickness and/or mark surface area versus area of element viewed in the plane of the geogrid. For example the percentage plan surface area of the pressure mark is tiny relative to rib/junction plan surface area such that the greater thickness of the pressure mark compared to the thickness of the other elements that comprise the geogrid has no significant impact on the mean thickness of the geogrid. This can be seen for example in FIG. 3A.

In the method of the invention for producing a geogrid, a polymeric starting sheet is subjected to a stretching operation in at least one direction so as to produce a geogrid precursor. Generally the polymeric starting sheet will be of unoriented polymer. Stretching of the sheet leads to the geogrid precursor of molecularly oriented polymer. The polymer orientation is such as to be irreversible under normal temperature conditions to which the geogrid is exposed after its manufacture, e.g. during storage, transport and use. Typically, the polymeric starting sheet will have a thickness in the range 4 to 9 mm (although values outside this range are not precluded). The degree of stretch imparted may be determined by the type of polymer from which the polymeric starting sheet is made. Preferably the polymer is of a type (e.g. HDPE) such that the stretch ratio of at least 4:1 in any direction may be employed, more preferably at least 5:1, even more preferably at least 7:1 and for example in the range 10:1 to 12:1. If a uniax geogrid is to be produced then stretching will only be effected in one direction, usually the length direction of the polymeric starting sheet. Alternatively, for a biax geogrid, the polymeric starting sheet may be stretched in two transverse directions.

The polymeric material used to prepare the polymeric starting sheet should be such that there are no (or no significant) apertures in the material which are caused to "open out" during the stretching operation, since ideally the only apertures in the final geogrid are those produced in the subsequent aperture formation step, to which more detailed reference is made below.

Stretching the polymeric starting sheet to produce the geogrid precursor may be effected in conventional manner. Thus, in accordance with preferred embodiments of the invention, the polymeric starting sheet is in the form of a web which is passed (after heating if necessary to soften the material) through the nips of firstly upstream and then secondly downstream sets of rollers, the downstream rollers rotating at a faster peripheral speed than the upstream rollers. The difference in peripheral speeds defines the stretch ratio imparted to the geogrid precursor element. Width restraint may be applied whilst the polymeric starting sheet is being stretched between the rollers but is not essential (lack of width restraint might result in some thickening at the marginal edge regions of the geogrid precursor element but these regions can be trimmed-off). If the geogrid to be manufactured is a uniax geogrid then this stretching operation may be the sole stretching operation employed in production of the geogrid precursor. If however the geogrid to be produced is a biax geogrid then there may be a subsequent stretching in the transverse direction, as well understood in the production of biax geogrids. Alternatively, the transverse stretch may be conducted before the longitudinal stretch or simultaneously therewith. Thus it is possible to effect the stretching operation on a stenter.

If desired, the geogrid precursor or the geogrid produced by forming apertures in a geogrid precursor may be subjected to a treatment to provide one or both of the major faces of the geogrid or precursor with surface profile formations, e.g. ridges, grooves, projections and/or indentations. Though in theory the profile treatment may be performed at any time, it is strongly preferred that it occurs after the geogrid or geogrid precursor has been stretched to orientate the polymer. Such surface formations are potentially of benefit in terms of enhancing the frictional retention of the geogrid within particulate material which, in use, it is embedded (e.g. increasing the coefficient of friction of the geogrid when interacting with soil).

To produce the geogrid of the invention, the geogrid precursor (produced as described above) is subjected to an aperture formation step to produce the final geogrid structure. For producing a uniax geogrid, the apertures should be elongate and ideally extend parallel to molecular orientation in the geogrid i.e. parallel to the (single) direction in which the sheet precursor was stretched. The apertures may, for example, have a length of 40 to 400 mm (preferably 50 to 200 mm) and a width of 5 to 100 mm (preferably 5 to 50 mm, more preferably from 2 to 10 mm), it being appreciated that in general the width value will be less than the length value. The depth of the apertures is governed by the thickness of the geogrid precursor which may be from 0.1 to 3 mm. Opposed longitudinal edges of the apertures may, for example, be spaced by 0.1 to 10 mm, preferably 0.1 to 3 mm.

The formation of the apertures in the geogrid precursor (to form the final geogrid mesh structure) may be effected by any convenient technique. Non-limiting examples of such techniques that may be employed are as follows:

Conventional reciprocating punch press with male punch/female die tooling
Rotary punch with rotating male punch/female die rollers
Rotary "kiss" cutting of a die roller against a plain roller
Ultrasonic cutting of the hole, or a region around the ends of a hole
Laser cutting of the hole, or a region around the ends of a hole
Infrared heating of the localised regions of the transverse bar between the machine direction tensile elements
Water jet cutting Preferably the apertures are formed by punching, particularly since this allows ready formation (as "pressure marks") of the integral beads mentioned above which extend at least partially around the apertures and project at least generally perpendicularly to the surface of the geogrid, and which serve to inhibit fracture (e.g. by tearing). The formation of the bead as a "pressure mark" is particularly convenient in the case of the manufacture of uniaxially oriented geogrids with elongate apertures having their (narrow) terminal edges extending transversely (preferably perpendicularly) to the direction of molecular orientation of the polymer. In this case, the "pressure mark" formed extends around the terminal edge of the aperture (where the geogrid is most prone to tearing because of the orientation of the polymer) and feathers to nil height only a short distance along the elongate sides of the aperture.

The formation of pressure marks is a well understood phenomenon in the punching of sheets, albeit that pressure marks are not normally associated with inhibiting tear resistance in polymeric mesh structures. Consider that the sheet to be punched has first and second sides and that the punch tools enter from the first side and pass through the sheet. The pressure mark is a localised deformation of the material of the sheet (forming the grid) at the edge of the punched aperture to form a bead (i.e. the pressure mark) projecting from the second side of the material at least partly around the edge of the aperture. In the punching of oriented polymeric materials, the pressure mark is most pronounced (i.e. of greatest height) where the edge of the aperture is perpendicular to the orientation of the polymer and less pronounced (and may be non-existent) where the edge of the aperture is parallel to the orientation of the polymer.

In accordance with conventional punching technology, there will be a stripper plate on the first side of the sheet and a die plate on the second side each with aligned apertures such that each punch tool is capable of passing through a respective aperture in the stripper plate, through the sheet and then into an aligned aperture in the die plate.

In one cycle of movement, the punch tool passes through the stripper plate, punches an aperture in the sheet, passes into the aperture in the die plate (the punched-out material being removed at the second side of the sheet), back through the sheet and then into the stripping plate which removes any material adhering to the tool before the next cycle of movement begins. Pressure marks are formed more easily where there is a small clearance (e.g. 2 to 5 mm) between the stripper plate and the first side of the sheet. As the punch enters the sheet the aforementioned clearance allows vertical displacement of material hence forming the pressure mark. However the stripper plate still fulfils its primary purpose of clamping the sheet against the die plate as the punch is withdrawn.

The method of the invention for forming the geogrid may be effected as a continuous process whereby a polymeric starting sheet is stretched (e.g. in the manner described) at an upstream "stretching station" to form the geogrid precursor and then continuously passed to a downstream "aperturing station" at which apertures are formed in the geogrid precursor to form the geogrid. Such a process may include an upstream "sheet formation" station for producing the polymeric starting sheet (e.g. from granules of polymeric material), the polymeric starting sheet then being passed continuously to the "stretching station". However, we do not preclude the possibility that manufacture of the geogrid may be effected other than in a continuous manner. Thus, for example, the geogrid precursor element may be produced at one manufacturing site and apertured (to form the geogrid) at a different site.

Geogrids of the invention may be used to stabilise or reinforce a particulate material for the purposes of a geoengineering construction, e.g. a slope, an embankment, a modular block or panel retaining wall, or any other suitable geotechnical structure. However, with particular reference to uniax geogrids, conventional uniax geogrids have a thick un-oriented transverse bar which may engage a connector used for attaching the conventional uniax geogrid to construction items like concrete blocks. In the case of uniax geogrids in accordance with the invention, there is no thick transverse bar of unoriented polymer and a necessary connection may be made via a "capstan wrap" connection where the geogrid is wrapped around the connector or simply by frictional forces between blocks or other facing elements of the structure, or by surcharge pressure from the particulate material in the case of an overlap joint.

The term "particulate material" as used in the previous paragraph includes soil, aggregate, rocks, stones, gravel, sand, earth, clay, aggregate held by a binder such as asphalt or cement, concrete, or any other particulate or cohesive material used in geotechnical engineering or building. This is sometimes referred to as "fill material".

Another aspect of the present invention broadly provides a geoengineering construction comprising (preferably strengthened and/or stabilized (e.g. mechanically stabilized by, more preferably strengthened by) a geogrid of the invention as described herein, a non-limiting list of such geoengineering constructions being selected from the group consisting of: embankment foundation, railway track ballast and/or sub ballast; road bed foundation, bridge abutment, retaining wall, steep 20 degrees) slope, slip repair, steel mesh face, wraparound face, terraced wall, wall and slope, vegetated face, non-vegetated face, modular blocks, panel retaining wall, marine unit and/or gabion face.

A still other aspect of the present invention broadly provides use of a geogrid of the invention as described herein with a particulate material to form a geoengineering construction (optionally as described herein) for at least one purpose selected from the group consisting of:
strengthening; stabilizing (optionally mechanically stabilizing), reducing layer thickness;
increasing the life of; increasing bearing capacity; controlling differential settlement;
capping weak deposits, and/or spanning voids:
of and/or beneath the particulate material and/or the geoengineering construction.

Unless defined otherwise, all technical and scientific terms used herein have and should be given the same meaning as commonly understood by one of ordinary skill in the art to which this invention belongs.

It is to be understood that the integral, mesh structure referred to herein is monolithic in nature, in other words, it is comprised of a single unit of material. Where the mesh structure is described as being formed of interconnecting mesh defining elements, the term 'interconnecting' is intended to convey that said elements, although distinguishable from other elements of the structure, are all physically connected as part of the same monolithic unit. The term 'interconnecting' is not to be interpreted as meaning that the elements are separated units which have been joined together (e.g. by mechanical fixings, adhesives or welding).

For the avoidance of doubt, the integral, mesh structure referred to herein is not composed of multiple, seperable elements which are affixed to one another (e.g. by the application of mechanical fixings, adhesives or welding processes). Nor is the integral, mesh structure referred to herein composed of a single element which has been affixed to itself at various points (e.g. by the application of mechanical fixings, adhesives or welding processes).

Unless the context clearly indicates otherwise, as used herein plural forms of the terms herein are to be construed as including the singular form and vice versa.

The terms "comprising", "comprises" or "comprised of" as used herein will be understood to mean that the list following is non exhaustive and may or may not include any other additional suitable items, for example one or more further feature(s), component(s), ingredient(s) and/or substituent(s) as appropriate, thus including the component(s) specified but not to the exclusion of the presence of others. The term "consisting essentially of" or "consists essentially of" means including the components specified but excluding other components except for materials present as impurities, unavoidable materials present as a result of processes used to manufacture the components, and components added for a purpose other than achieving the technical effect of the invention. Typically, a composition consisting essentially of a set of components may comprise less than 10% by weight, more typically less than 5% by weight, and even more typically less than 1% by weight of non-specified components based on the total weight of the composition being 100%.

The term "consisting of" or "consists of" means including the components specified excluding other components.

Whenever appropriate, the term "comprises", "comprising" or "comprised of" may also be taken to include the additional meanings "consisting essentially of", "consists essentially of", "consists of" or "consisting of".

In the discussion of the invention herein, unless stated to the contrary, the disclosure of alternative values for the upper and lower limit of the permitted range of a parameter coupled with an indication that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s)

thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises a proportion of at least 95%, especially at least 96%, more especially at least 97%, even more especially at least 98%, most especially at least 99%, for example about 100% of the relevant whole. By analogy the term "substantially-free" may similarly denote that quantity or entity to which it refers comprises no more than 10%, preferably no more than 8%, more preferably no more than 5%, especially no more than 4%, more especially no more than 3%, even more especially no more than 2%, most especially no more than 1%, for example about 0% of the relevant whole.

It will be appreciated that certain features of the invention, which for clarity may be described in the context of one or more separate embodiment(s) may also be provided in combination in other embodiment(s) which may or may not be described herein. Conversely various features of the invention, which are for brevity, described as combined in the context of a single embodiment, may also be provided separately or in any suitable sub-combination in yet other embodiment(s) which may or may not be described herein. Feature(s) described in the context of one or more of the aspect(s) and/or embodiment(s) of the present invention also apply to the other aspect(s) and/or embodiments of the invention whether or not such features are stated as preferred and/or similar terminology.

Although embodiments have been disclosed in the description with reference to specific examples, it will be recognized that the invention is not limited to those embodiments and/or examples. All intermediate generalizations between the broadest scope of the invention described herein and each of the embodiments and/or examples described herein are thus envisaged as comprising the present invention. Combinations and/or mixtures of any features described in any embodiment of the invention which may be applied to any other embodiments of the invention whether by analogy or otherwise and also comprise the present invention.

It will be understood that the materials used and the details may be slightly different or modified from the description without departing from the methods and/or compositions disclosed and taught by the present invention.

Many other variants and/or embodiments of the invention will be apparent to those skilled in the art and such variants are contemplated within the broad scope of the present invention. Various modifications may become apparent to those of ordinary skill in the art and may be acquired from practice of the invention and such variants are contemplated within the broad scope of protection for the present invention as allowed under applicable local law even if the variant may be outside the literal meaning of the claims. No inference should be made from any embodiments, examples and/or preferred features described in the application that any such variants are excluded from such scope of protection.

Further aspects of the invention and preferred features thereof are given in the claims herein, which form an integral part of the disclosure of the present invention whether or not such claims correspond directly to parts of the description herein.

BRIEF DESCRIPTION OF THE DRAWINGS

The invention will be further described by way of example only with reference to the following non-limiting Examples and the accompanying drawings also described herein.

In the figures referred to herein some of the reference numbers refer to the following elements: 1 denotes a geogrid generally; 2 denotes rib structures; 3 denotes bar structures; 4 denotes elongate apertures; 5 denotes junctions; 6 denotes a rib segment or strand; 7 denotes a bar segment; and 10 denotes a pressure mark.

FIG. 5 compares the short term tensile strength behaviour of a geogrid of the invention (the top line of the graph labelled 11) with a conventional HDPE uniaxial reinforcing geogrid (shown as the bottom line of the graph labelled 13).

In FIG. 6, the (top line of) data, generally labelled 15 and indicated by diamonds, is data generated from the conventional uniax geogrid available commercially from Tensar under the trade designation RE560, where the geogrid ruptured at the time indicated by label 19 in FIG. 6. The bottom line of data, generally labelled 17 and indicated by triangles, is data generated from a sample according to the invention where the geogrid was still live after the duration of the test indicated by label 21 in FIG. 6.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
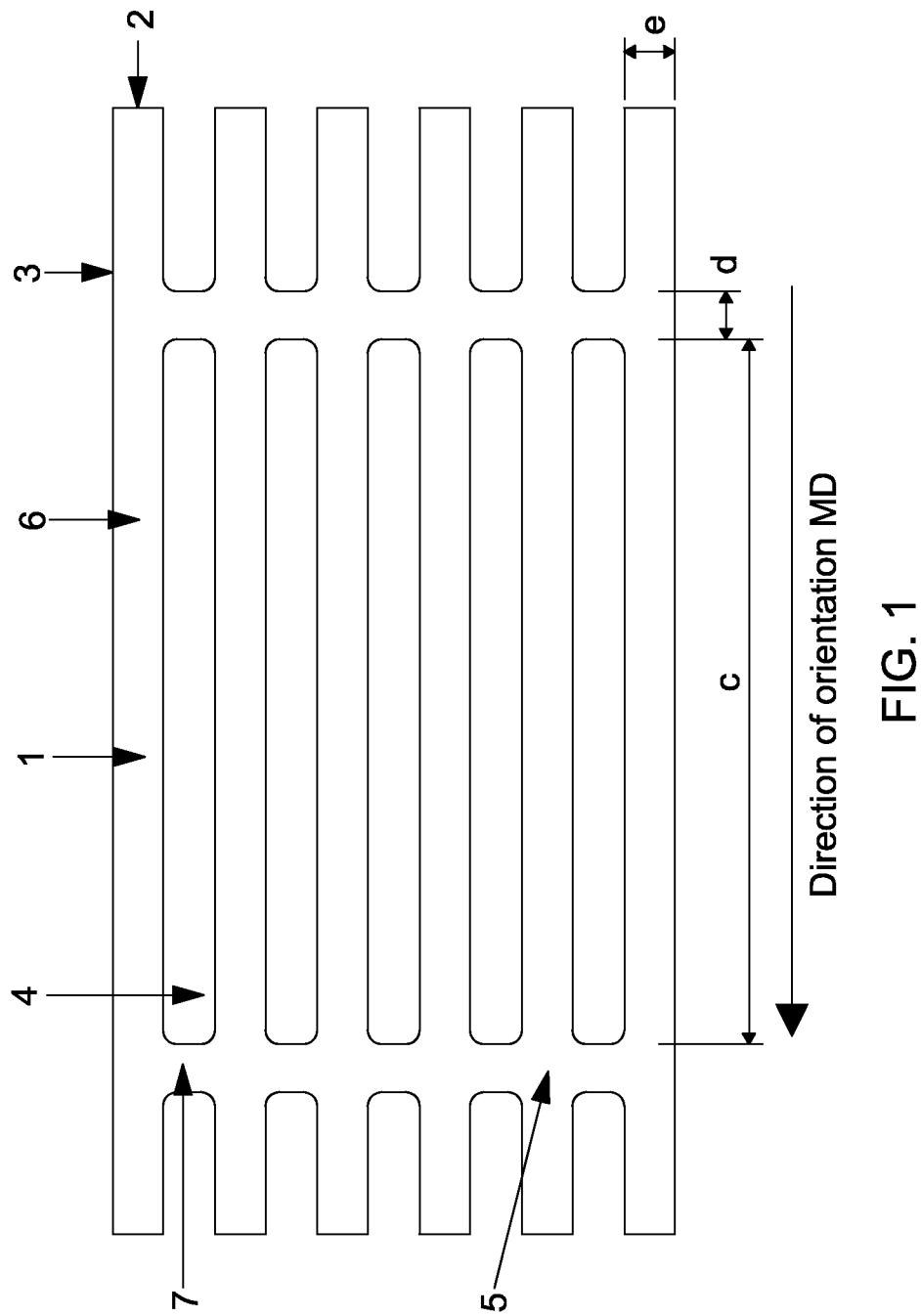
FIG. 1 shows a portion of a uniax geogrid in accordance with the invention. Certain dimensions are denoted in FIG. 1 by labels where "c" refers to the length of the elongate apertures, "d" refers to the width of the bar structures and "e" refers to the width of the rib structures. For one specific geogrid illustrated by FIG. 1, c is 210 mm; d is 16 mm and e is 9.5 mm.

FIG. 1 illustrates a portion of a uniaxially oriented geogrid 1 in accordance with the invention which has been produced by stretching a plastics sheet starting material in a single direction MD as indicated by the arrow in FIG. 1 (MD being an abbreviation for "machine direction") so as to molecularly orient the material in that direction and subsequently forming elongate apertures in the stretched material. The geogrid 1 comprises rib structures 2 which extend generally parallel to the machine direction MD. The rib structures 2 are transversely spaced from each other and connected at regularly spaced intervals by bar structures 3 extending in the transverse (TD) direction whereby a plurality of longitudinal extending, elongate apertures 4 with radiused corners are defined in the geogrid 1. As further shown in FIG. 1, the rib structures 2 and bar structures 3 meet at junction regions 5 of the geogrid 1. Each rib structure 2 is continuous throughout the geogrid 1 as are the bar structures 3. Thus the junctions 5 are considered simultaneously to be both part of a rib structure 2 and a bar structure 3. As represented in FIG. 1, each rib structure 2 is comprised of an alternating arrangement of rib segments or strands 6 and junctions 5 whereas each bar structure 3 is comprised of an alternating arrangement of junctions 5 and bar segments 7.

Expressed alternatively, the geogrid 1 shown in FIG. 1 may be considered to comprise the rib structures 2 with the bar segments 7 acting as "connectors" between adjacent rib structures.

There are a number of points to note about the geogrid 1. Firstly, the geogrid is of generally uniform thickness. Any deviation from non-uniformity is likely to result for the case where the web material (from which the geogrid is produced) is unrestrained in the width direction during the stretch in the length direction, in which case the marginal edge regions of the stretched web may be slightly thicker than the central region (these marginal edges may be removed from the commercial product). There may also be some localised non-uniformity in thickness around parts of the apertures. Secondly, the degree of orientation in the MD direction is the same throughout the geogrid.

It will therefore be appreciated that the uniax geogrid 1 of FIG. 1 differs from conventional uniax geogrids in that it is uniformly "flat" rather than having thickened junctions. Furthermore, the orientation in the MD direction is uniform along the length of the rib structures 2 and throughout the geogrid. Thus in contrast to conventional uniax geogrids, there is no variation in orientation along a rib structure (going in the MD direction). Additionally, and relatedly, the geogrid of the invention avoids a disadvantage of prior uniax geogrids where unoriented polymer does not contribute significantly to the strength of the geogrid but is encapsulated in the thickened junctions and bar segments of the prior uniax geogrids.

Figure 2:
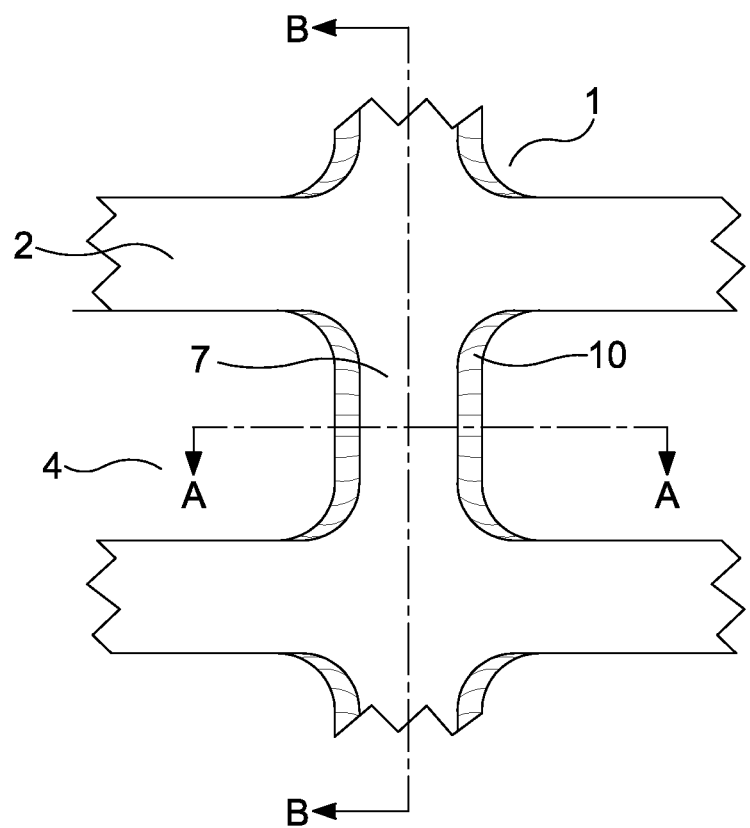
FIG. 2 schematically illustrates, to a much enlarged scale, a portion of the underside of a geogrid as shown in FIG. 1.
Figure 3A:
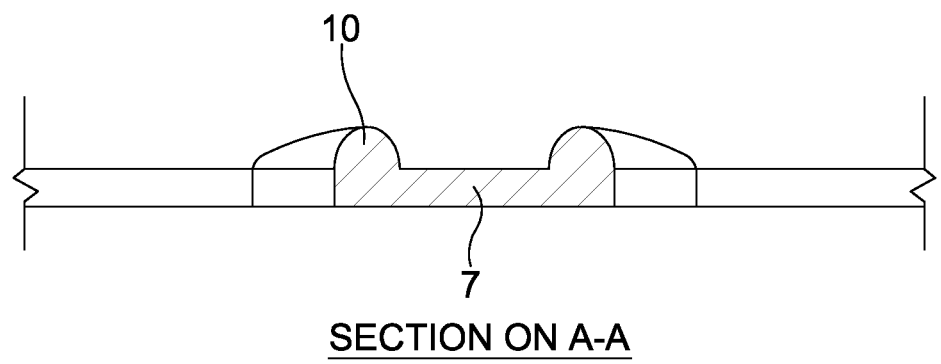
FIG. 3a is a sectional view on the line A-A of FIG. 2.
Figure 3B:
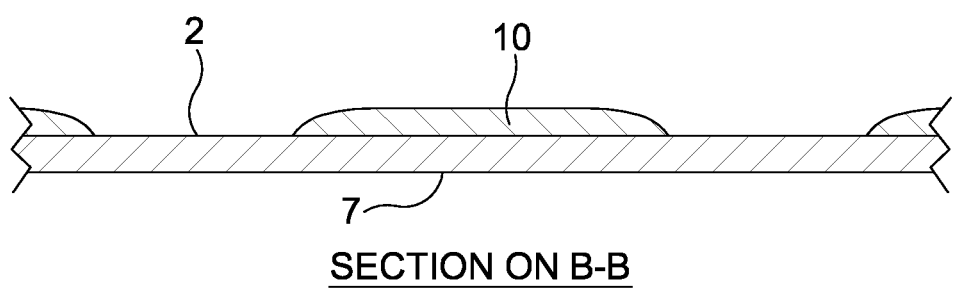
FIG. 3b is a sectional view on the line B-B of FIG. 2.

Reference is now made to FIG. 2 which schematically illustrates, to a much enlarged scale, a portion of the underside of a geogrid 1 of the type shown in FIG. 1 and also to FIG. 3a which is a sectional view on the line A-A of FIG. 2. Shown in FIG. 2 are the rib structures 2 providing the tensile elements, the connector elements 7 extending transversely to (and connecting) adjacent rib structures 2, and the elongate apertures 4. The geogrid illustrated in FIG. 2 has been produced by a punching operation under conditions such that a pressure mark 10 has been formed along the end regions of the apertures 4 on one side of the geogrid 1. As will be appreciated from FIGS. 2, 3a and 3b, the pressure mark 10 is, in effect, a bead of the polymer that forms the geogrid 1, where the polymer is standing proud of the surface on which it is provided. The pressure mark 10 has its maximum height along its extent transverse to the rib structures 2 and becomes of decreasing height as it turns around the corners of the apertures 4 so as to reach nil height after only a very short extent along the edges of the rib structures —see particularly FIG. 3b.

The pressure mark 10 provides reinforcement at the ends of the apertures and as such inhibits tearing of the connector 7 (bar segment) from one edge to the other. Although not illustrated in FIGS. 2, 3a and 3b, it will be appreciated that pressure marks 10 are provided on the same side of the geogrid at each end of the apertures.

Example 1 (FIGS. 1, 2, 3a, 3b & 4)

In this Example, the method of the invention was used for producing a geogrid from an extruded, initially unoriented sheet of High Density Polyethylene (HDPE) having an indefinite length, a width of 1515 mm and a nominal thickness of 6.35 mm (giving a cross-sectional area of approximately 9620 mm$^2$).

First Step

In a first step of the process, the sheet of unoriented HDPE was heated to a temperature of about 105° C. and then drawn (in the length direction, LD or MD) at a nominal draw ratio of about 10:1 prior to cooling. No restraint on width was applied to the web during the drawing step. Samples of the oriented web were then cut for further processing in the second step of the process (see below).

The width of the oriented web was 1249 mm (the reduction as compared to the starting width of 1515 mm being due to lack of width restraint during the draw process) and it was noted that the oriented web was somewhat thicker at the outer marginal regions (about 50 mm inbound of each edge) than at the centre.

The average thickness of the oriented web was determined to be 0.76 mm, giving a cross-sectional area of about 949 mm². This compares with a cross-sectional area of about 9620 mm² for the starting material, thus confirming the anticipated draw ratio of about 10:1.

Second Step

In the second step of the process, samples of the sheet of oriented HDPE obtained from the first step were perforated to produce a geogrid 1 as shown in FIG. 1 in which the apertures 4 had a length of approximately 210 mm and a width of approximately 9.5 mm. The transverse connectors 7 had a width (i.e. its dimension perpendicular to the MD direction) of approximately 16 mm.

Perforating was effected by feeding the samples (in the length direction, LD or MD) through a perforating station provided with side-by-side matched punches and dies having a length of 25.4 mm. The punches had radiused ends and formed waists where the width at their mid-points was less than at their ends. To produce the geogrid the punching station was programmed to make a single stroke followed by 13 consecutive 14.6 mm index strokes followed by a larger single index of 41.28 mm to form the transverse bar. The punch tool formed an aperture that formed slight waists of narrower widths intermediate to the width at its ends (the punch has a corresponding waist shape).

Figure 4:
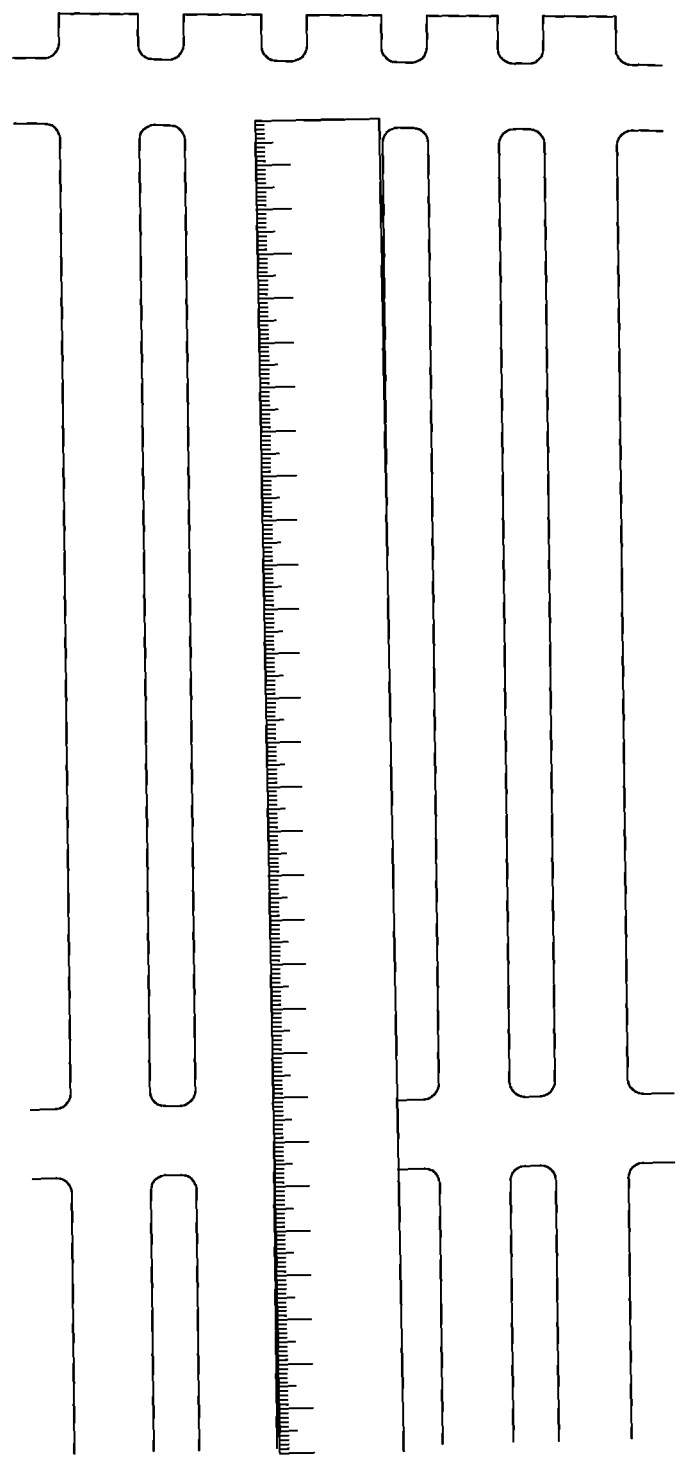
FIG. 4 is a photograph of a sample of the geogrid produced in Example 1, shown next to a ruler for scale.

FIG. 4 is a photograph of a geogrid obtained by this method which shows that the side edges of apertures 4 have a slightly scalloped profile. This is due to overlap of the relative positions (in the MD) of the waist shaped punches and the sheet in successive index strokes as sheet travels through the perforating station in the MD to form the elongate apertures 4.

Figure 5:
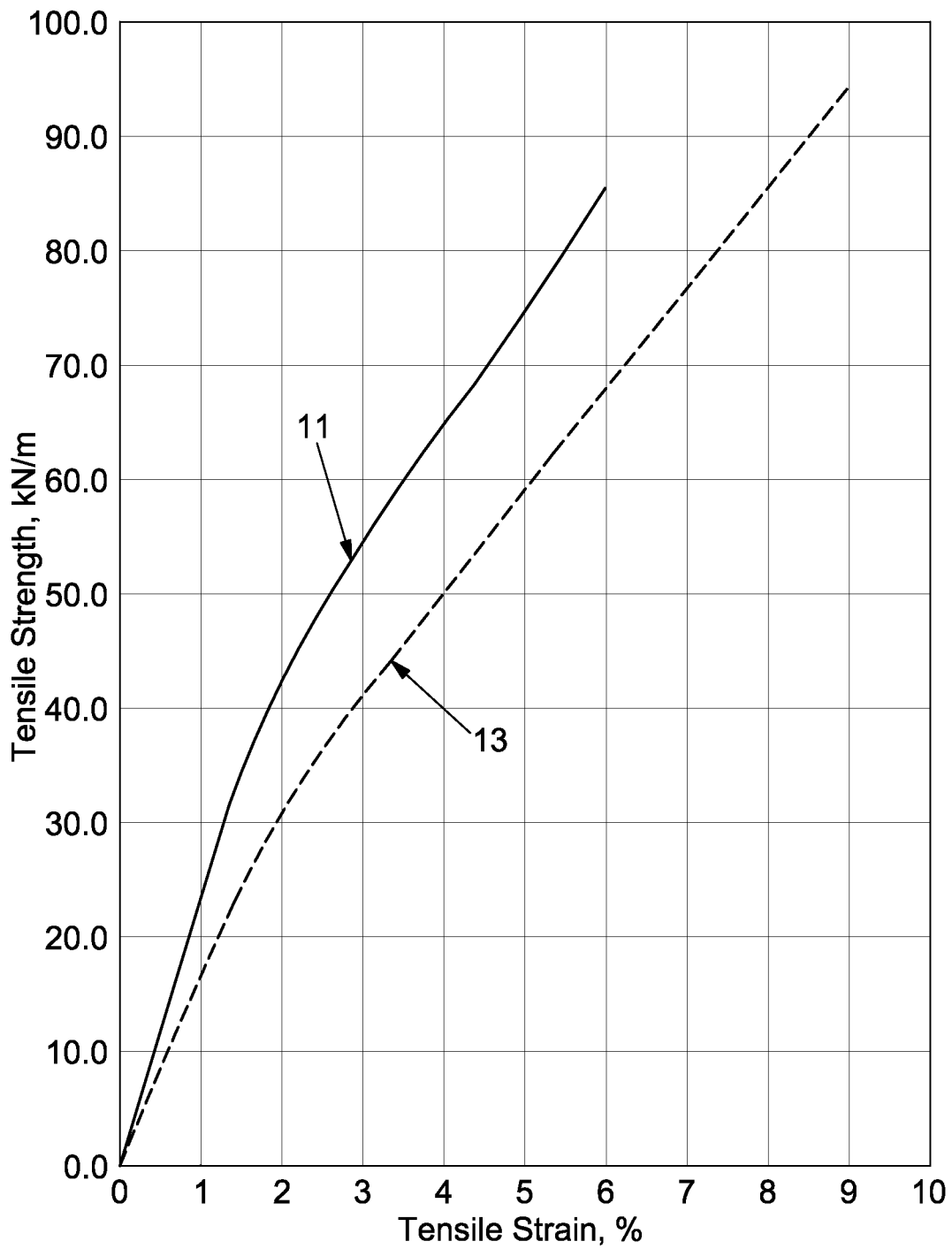
FIG. 5 is a graph of Tensile Strength (y-axis) vs Tensile Strain (x-axis) for both a geogrid produced in accordance with Example 1 and a comparative strength a conventional uniax geogrid.

Example 2 (FIG. 5)

For a uniax geogrid intended for soil reinforcement applications such as in walls or slopes, two properties of the material of the geogrid are especially useful. The first is the short-term tensile strength and the second is the percentage of the short-term tensile strength available for the long-term "creep" performance of the product.

This Example demonstrates short term tensile testing of rib segments cut from the geogrid produced in accordance with Example 1 and compares the results with those obtained for a conventional uniax geogrid commercially available from Tensar International Ltd under the designation RE560. Tensile test specimens in accordance with ISO10319 were cut from the geogrid produced in accordance with Example 1. Tensile testing was carried out according to ISO10319 on a testing machine available from Instron, with the jaws drawn relatively apart at a rate of 20% of the specimen gauge length in accordance with the ISO10319 Standard. The results are shown in the following Table.

| Ex | Strain at Max Load (%) | Strength at 2% Strain (kN/m) | Strength at 5% Strain (kN/m) | Strength At Max Load (kN/m) |
|---|---|---|---|---|
| 1 | 5.9 | 43.66 | 75.65 | 85.51 |
| 2 | 6.33 | 41.64 | 73.4 | 88.06 |
| 3 | 5.63 | 43.22 | 76.3 | 83.22 |
| 4 | 5.96 | 40.7 | 72.7 | 83.12 |
| 5 | 6.03 | 42.94 | 75.6 | 86.95 |
| Mean | 5.97 | 42.44 | 74.7 | 85.37 |

For the purposes of comparison FIG. 5 shows a composite plot of the results of the above tensile tests with those obtained for rib segments of the same length cut from a uniax geogrid produced by Tensar, which is produced from the same polymer (HDPE) and which, of the uniax geogrids Tensar produce, provides the closest match in terms of tensile strength to the product of Example 1. Once the 6.35 mm sheet was oriented to 10:1 the resulting punched geometry had a strength similar to the conventional uniax product produced from 4.05 mm sheet.

FIG. 5 shows a composite plot of tensile results for the test specimens cut from the geogrid produced in accordance with the invention (top, solid line 11) in comparison to a set of population average data for the prior art RE560 product (bottom, dashed line, 13).

The data in FIG. 5 shows that the short-term tensile strength material efficiencies (potential material efficiency benefit) of the two materials tested can be calculated by dividing the short-term tensile strength by the mass per unit area.

Invention=(85.4/0.50)=171(kN/m)/(kg/m²)

RE560=(94.0)/0.62=152(kN/m)/(kg/m²)

Thus the gain in short-term tensile efficiency of the geogrid of the invention over an equivalent strength conventional uniax product is about 12.5% on the basis of weight of polymer.

Furthermore, FIG. 5 clearly demonstrates that the tensile curves for the product of the invention are much "stiffer"—for the same percentage strain the tensile strength is 20% to 30% higher for the geogrid of the invention (plot 11) than for the conventional equivalent strength uniax (plot 13). Strain at maximum load is also lowered by a significant percentage but the ultimate tensile strength is within 10%, i.e. 85.4 kN/m for the product of the invention as compared to 94.0 kN/m for the conventional equivalent uniax product.

Figure 6:
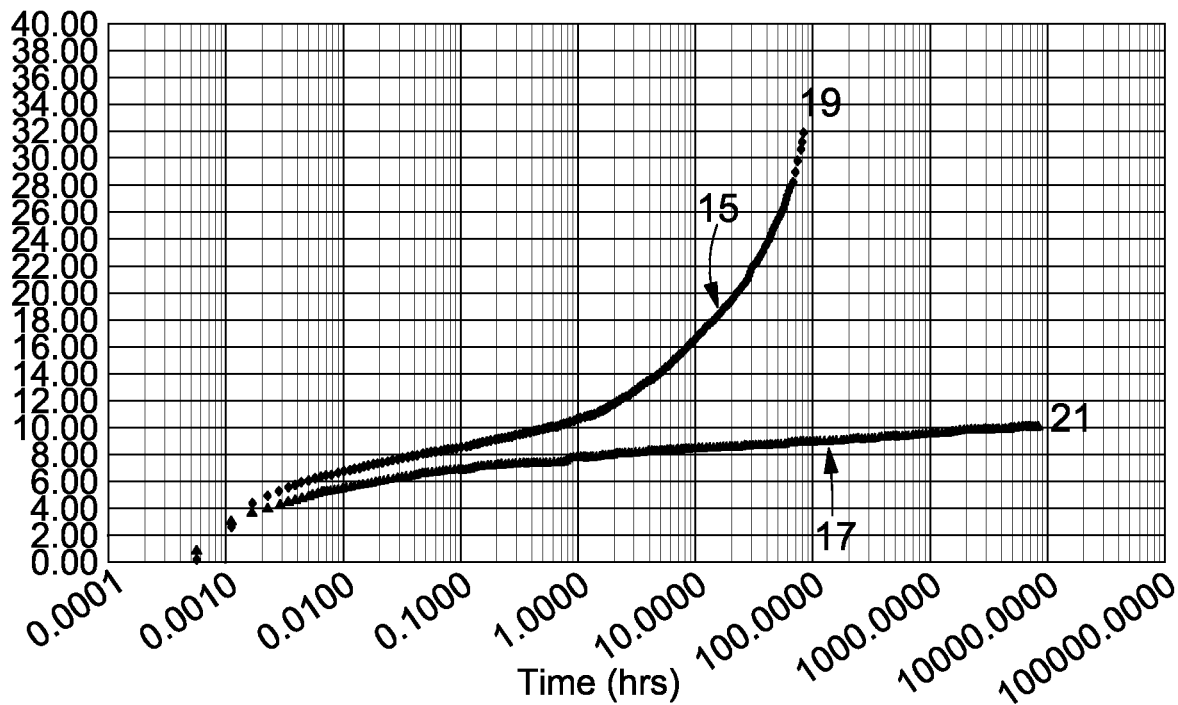
FIG. 6 shows creep data for a geogrid in accordance with the invention and a conventional uniax geogrid, both tested at 60% load and 20° C.

Example 3 (FIG. 6)

This Example demonstrates the creep properties of a geogrid produced according to Example 1 in comparison with those of a conventional equivalent strength uniax product.

A sample of geogrid produced in accordance with Example 1 was subjected to a static creep test according to BS EN ISO 13431:1999 at 20° C. using a load corresponding to 60% of short term tensile strength. For comparison an example of a conventional equivalent strength uniax geogrid (RE560) was subjected to the same 20° C. temperature and load corresponding to 60% of its short-term tensile strength. The results are shown in FIG. 6 which is a plot of strain (y-axis) vs time (x-axis) where the top plot (diamonds, 15) is data generated by the prior art geogrid RE560 and the bottom plot (triangles, 17) is data generated by the geogrid of Example 1.

A comparison of the two data plots (15, 17) in FIG. 6 clearly demonstrates that the geogrid produced in accordance with the invention (data 17) exhibits much lower strain than the geogrid RE560 of conventional structure (data 15). This is due primarily to the reservoir of unoriented polymer locked into the bars of the conventional geogrid structure. It can also be seen that whilst the conventional geogrid ruptured at approx. 90 hours (datum 19), the geogrid produced in accordance with the invention was still live at approximately 11000 hours, an increase of over two log cycles (datum 21).

Figure 7:
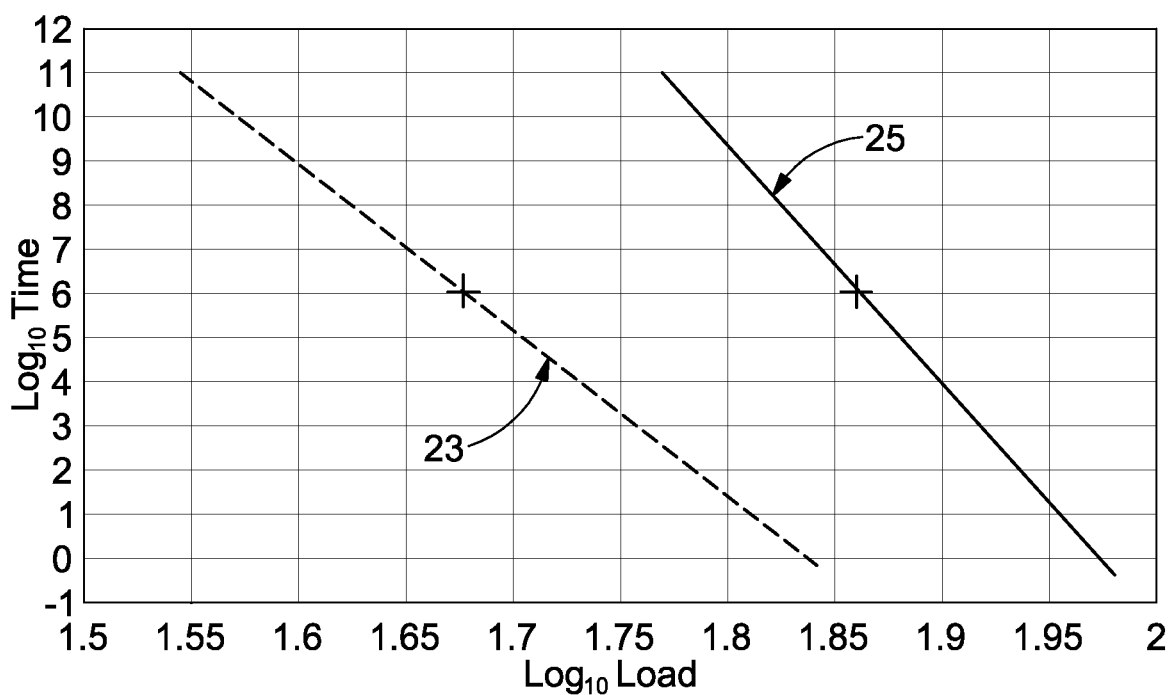
FIG. 7 is plot of creep data (plotted as $\log_{10}$(time) on the ordinate versus $\log_{10}$(load) on the abscissa) to compare creep performance of prior art geogrids (a conventional HDPE uniaxial reinforcing geogrid) the data denoted generally by label 23 and plotted as the dashed line to the left in FIG. 7 and geogrids in accordance with the invention denoted generally by label 25 and plotted as the solid line to the right in FIG. 7. In data set 25, the creep data of the invention, a cross indicates a $\log_{10}$(load)=1.86 or 72% of ultimate tensile strength (UTS) after $10^6$ hours. In data set 23, the creep data of, the conventional HDPE uniaxial geogrid, a cross indicates a $\log_{10}$(load)=1.68 or 47.5% of UTS after $10^6$ hours.

Example 4 (FIG. 7)

Conventional static creep loading carried out in accordance with BS EN ISO 13431:1999 formed part of a Time Temperature Superposition (TTS) creep program to establish a creep reduction factor RFcr in accordance with PD ISO/TR 20432:2007. As part of the process of establishing RFcr, in addition to the aforementioned TTS creep program, a Stepped Isothermal Method (SIM) program of creep testing was also carried out in accordance with ASTM D6992-03.

FIG. 7 shows the resulting composite SIM/TTS creep regression plot for the geogrid produced in accordance with the invention (solid line 25), in comparison to a conventional HDPE uniaxial reinforcement geogrid (dashed line 23). The geogrid produced in accordance with the invention has RFcr of 72% at $10^6$ hours at 20° C., whilst the conventional uniaxial geogrid has RFcr of 47.5% at $10^6$ hours at 20° C.

The data in FIG. 7 show that when the short-term tensile strength is multiplied by the creep reduction factor the potential long-term material efficiency benefit of the two materials tested increases further because of the greater creep resistance of the invention compared to a conventional HDPE geogrid Invention=(85.4*72%)/0.50)=123(kN/m)/(kg/m$^2$)

RE560=(94.0*47.5%)/0.62)=72(kN/m)/(kg/m$^2$)

Thus the gain in long-term creep limited tensile efficiency of the geogrid of the invention over an equivalent strength conventional uniax product is about 60% on the basis of weight of polymer.

Figure 8:
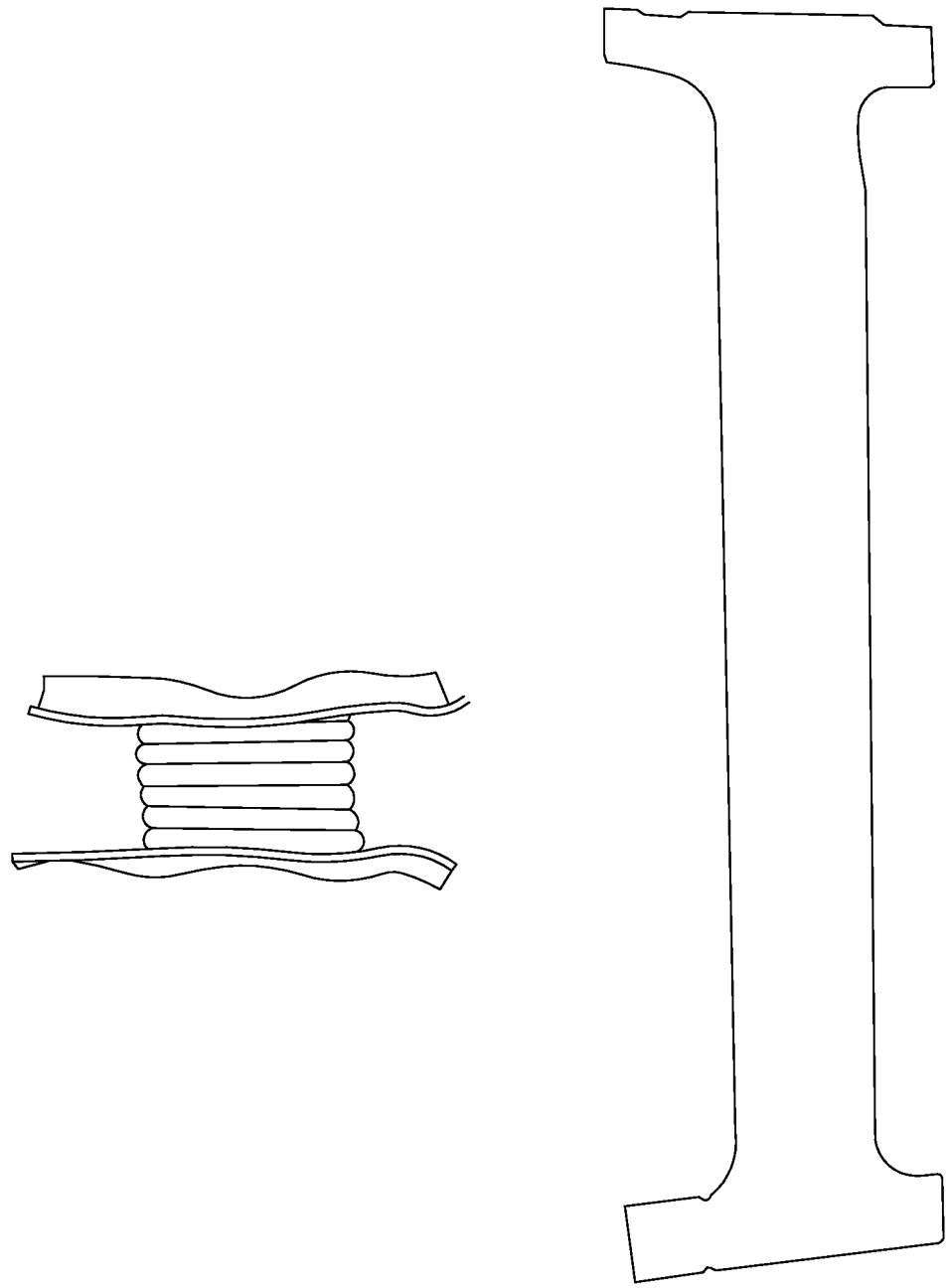
FIG. 8 is a photograph of a rib element of a geogrid of the invention before and after a reversion test used to determine the draw ratio i.e. degree of molecular orientation of that element. The photograph FIG. 8 has been redrawn in FIG. 8A (longer rib element before reversion) and FIG. 8B (shorter rib element after reversion) so that the dimensions seen in the photograph and referred to herein are indicated clearly. The scalloping of the side edges of the rib element before the test can be seen in the photograph (FIG. 8) but for clarity are omitted in the corresponding drawing (FIG. 8A). The dimensions of a rib element as photographed in FIG. 8 are, for the oriented element pre-test (as shown in FIG. 8A) labelled by: "f" (rib starting length); by "g" (rib starting width); and by "h" (bar starting width); and for the reverted element post-test (as shown in FIG. 8B) labelled by: "i" (rib finishing length); by "j" (rib finishing width); and by "k" (bar finishing width). For the specific rib element shown in the photograph of FIG. 8: pre-test (FIG. 8A): f is 108 mm; g is 14 mm; and h is 6 mm; and post-test (FIG. 8B): i is 11 mm; j is 15 mm; and k is 0.6 mm. However it will be appreciated that different values of dimensions "f" to "k" may also be obtained in a reversion test of other rib elements of geogrids according to the invention.
Figure 8B:
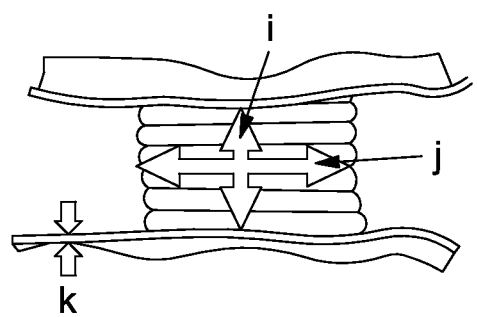
Figure 8A:
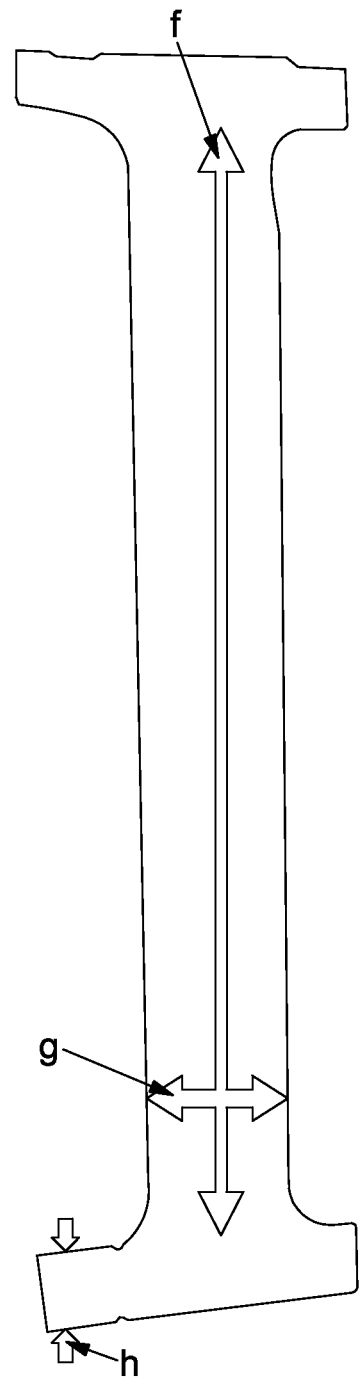

Example 5 (FIGS. 8, 8A & 8B)

Shrinkage Reversion test for molecular orientation.

FIG. 8 is a photograph showing a single test of a tensile element (rib and bar) from a geogrid of the invention, the element being made from oriented HDPE (large element on the right of FIG. 8, also drawn as FIG. 8A). The element was held at 150° C. for 60 minutes to revert the polymer so the element shrank and the reverted element is shown on the left of FIG. 8 (also drawn as FIG. 8B). The rib part of the element had a starting length in the machine direction (MD) of 108 mm (the dimension labelled "f" in FIG. 8A) and a length at the end of the test (finishing length) of 11 mm (labelled "i" in FIG. 8B) which is a 9.8:1 draw ratio. The actual draw ratio of the rib during production was 10:1 so this test has an accuracy within 2%. The starting width of the rib in the transverse direction (TD) was 14 mm (labelled "g" in FIG. 8A), with a finishing width of 15 mm (labelled "j" in FIG. 8B) which is a 0.93:1 expansion. This confirms that the polymers in this rib were substantially un-oriented in TD. The dimensions of the bar part of the same element is also measured to have an initial width of 6 mm (labelled "h" in FIG. 8A), in MD direction and a 0.6 mm finishing width (labelled "k" in FIG. 8B), measured using a micrometer, which is a 10:1 draw ratio. This confirms that the bar part of the element had the same orientation in the MD as the rib part of the element. Starting thickness of the bar was 0.8 mm with the finishing thickness being 6.5 mm after reversion which is close to the 6.35 mm nominal thickness of the polymer sheet before it was stretched to orientate the polymer, which also provides confirmation of the draw ratio in MD.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A geogrid comprising an integral, mesh structure, the integral, mesh structure comprising molecularly orientated polymeric material and being formed of interconnecting mesh defining elements including elongate tensile elements, the molecular orientation of the integral, mesh structure being uniform throughout an extent thereof, and
said geogrid having a thickness of 0.1 to 3 mm.

2. The geogrid as claimed in claim 1, wherein the cross-section of the elongate tensile elements is uniform along a length thereof.

3. The geogrid as claimed in claim 2, wherein the cross-section of the elongate tensile elements is rectangular.

4. The geogrid as claimed in claim 1, wherein the polymeric material is uniaxially oriented.

5. The geogrid as claimed in claim 4, wherein the geogrid has a Creep Reduction Factor ($RF_{CR}$) determined in accordance with PD ISO/TR 20432:2007 based on a Static Creep Test in accordance with BE EN ISO 13431:1999 and Stepped Isothermal Method creep testing in accordance with ASTM D6992-03 of at least 55%.

6. The geogrid as claimed in claim 4, wherein the geogrid has a stretch ratio of at least 4:1.

7. The geogrid as claimed in claim 4, wherein the geogrid has a tensile strength of at least 30 kN/m.

8. The geogrid as claimed in claim 4, with the interconnecting mesh defining elements comprising:
(i) a plurality of the elongate tensile elements extending parallel to each other in a direction of molecular orientation, and
(ii) a plurality of connector elements integral with the elongate tensile elements and each serving to connect adjacent elongate_tensile elements together, the connector elements connecting any two of the elongate tensile elements together being spaced from each other in the direction of molecular orientation, thereby defining, with the elongate tensile elements, elongate apertures extending parallel to the elongate tensile elements.

9. The geogrid as claimed in claim 8, wherein the elongate tensile elements have a width of 2 to 50 mm, the elongate apertures have a length of 40 to 400 mm and a width of 5 to 100 mm, and the connector elements have a width as measured in a longitudinal direction of the elongate tensile elements of 2 to 20 mm.

10. The geogrid as claimed in claim 9, wherein the elongate tensile elements have a width of 5 to 40 mm, the elongate apertures have a length of 40 to 250 mm and a width of 10 to 80 mm, and the connector elements have a width of 6 to 18 mm.

11. The geogrid as claimed in claim 8, wherein the connector elements are arranged as a plurality of sets in which the connector elements of any one set are aligned with each other in a direction transverse to the elongate tensile elements and the sets are spaced from each other in the direction of molecular orientation.

12. The geogrid as claimed in claim 8, wherein the geogrid has integral beads of the polymeric material on a face of the geogrid at least partly around peripheral edges of the apertures.

13. The geogrid as claimed in claim 12, wherein the integral beads are formed along the ends of the apertures and reduce to zero height along the elongate edges thereof.

14. The geogrid as claimed in claim 4, wherein:
(a) the elongate tensile elements comprise a plurality of generally parallel rib structures extending in a direction of molecular orientation, and (b) the interconnecting mesh defining elements further comprise a plurality of spaced, generally parallel bar structures extending transversely to the rib structures, said rib structures and said bar structures being interconnected by junctions at spaced locations along respective lengths thereof, whereby the rib structures are sub-divided along their lengths into alternating junctions and rib segments and the bar structures are sub-divided along their lengths into alternating bar segments and junctions.

15. The geogrid as claimed in claim 14, wherein the rib structures have a width of 2 to 50 mm, the apertures have a length of 40 to 400 mm and a width of 5 to 100 mm, and the bar structures have a width of 2 to 20 mm as measured in a longitudinal direction of the rib structures.

16. The geogrid as claimed in claim 15, wherein the rib structures have a width of 5 to 40 mm, the apertures have a length of 40 to 250 mm and a width of 10 to 80 mm, and the bar structures have a width of 6 to 18 mm.

17. The geogrid as claimed in claim 1, wherein the polymeric material is biaxially orientated, optionally the geogrid having a stretch ratio of at least 1.5:1 and/or further optionally the geogrid having a tensile strength of at least 10 kN/m.

18. A method of strengthening a particulate material, the method comprising embedding in the particulate material the geogrid as claimed in claim 1.

19. A strengthened particulate material, the strengthened particulate material comprising:
a particulate material having embedded therein the geogrid as claimed in claim 1.

20. A geoengineering construction comprising a mass of particulate material having embedded therein the geogrid as claimed in claim 1.

21. The geoengineering construction as claimed in claim 20, wherein the geoengineering construction is selected from the group consisting of embankment foundation, railway track ballast and/or sub ballast, road bed foundation, bridge abutment, retaining wall, steep >20 degrees slope, slip repair, steel mesh face, wraparound face, terraced wall, wall and slope, vegetated face, non-vegetated face, modular blocks, concrete panel, marine unit, and gabion face.

22. The geoengineering construction as claimed in claim 20, wherein the geogrid imparts to the geoengineering construction an improvement, as compared to the construction absent said geogrid, in at least one property selected from the group consisting of strength, stabilization, layer thickness, life, bearing capacity, control of differential settlement, ability to cap weak deposits, and ability to span voids of and/or beneath the particulate material and/or geoengineering construction.

23. The geoengineering construction as claimed in claim 20, comprising the mass of particulate material improved in at least one property selected from the group consisting of strength, stabilization, layer thickness, life, bearing capacity, control of differential settlement, ability to cap weak deposits, and ability to span voids of and/or beneath the particulate material and/or geoengineering construction, by embedding therein the geogrid.

24. A method of forming a geoengineering construction for at least one purpose selected from the group consisting of
strengthening, stabilizing, reducing layer thickness, increasing the life of, increasing bearing capacity, controlling differential settlement, capping weak deposits, and spanning voids of and/or beneath the particulate material and/or geoengineering construction,
the method comprising embedding the geogrid as claimed in claim 1 within a particulate material.

25. A geogrid comprising an integral, mesh structure, the integral, mesh structure comprising polymeric material and comprising elongate tensile elements interconnected by junctions in the integral, mesh structure, wherein the junctions and the elongate tensile elements have a same mean thickness, the molecular orientation of the integral, mesh structure being uniform throughout an extent thereof, and
said geogrid having a uniform thickness of 0.1 to 3 mm.

26. A geogrid comprising an integral, mesh structure, the integral, mesh structure comprising molecularly orientated polymeric material and comprising elongate tensile elements interconnected by junctions in the mesh structure, wherein there is no thickening of the junctions caused by stretching of the polymeric material, the molecular orientation of the integral, mesh structure being uniform throughout an extent thereof, and
said geogrid having a uniform thickness of 0.1 to 3 mm.

27. A uniax geogrid comprising an integral, mesh structure, the integral, mesh structure comprising polymeric material which is uniaxially oriented, the molecular orientation of the integral, mesh structure being uniform throughout an extent thereof, and the uniax geogrid having a Creep Reduction Factor ($RF_{CR}$) determined in accordance with PD ISO/TR 20432:2007 based on a Static Creep Test in accordance with BE EN ISO 13431:1999 and Stepped Isothermal Method creep testing in accordance with ASTM D6992-03 of at least 55%.

28. A method of producing a geogrid, the method comprising the steps of:
(a) stretching an elongate polymeric starting sheet having a thickness of from 2 to 12 mm to form a geogrid precursor comprising molecularly orientated polymer, the geogrid precursor being of essentially uniform thickness and having a thickness of 0.1 to 3 mm, and
(b) converting the geogrid precursor into a geogrid by forming apertures in the geogrid precursor to define an integral mesh structure formed of interconnecting mesh defining elements including elongate tensile elements, the molecular orientation of the integral mesh structure being uniform throughout an extent thereof.

29. The method as claimed in claim 28, wherein the polymeric starting sheet has a mean thickness of 4 to 10 mm.

30. The method as claimed in claim 28, wherein the apertures are formed such that the elongate tensile elements are generally rectangular as seen in cross-section at right angles to a longitudinal extent of the elongate tensile elements, the length sides of rectangular cross-section being along faces of the geogrid.

31. The method as claimed in claim 30, wherein the apertures are formed such that the elongate tensile elements have a width on opposite sides of the geogrid of 2 to 20 mm.

32. The method as claimed in claim 31, wherein the width of the elongate tensile elements is from 6 to 18 mm.

33. The method as claimed in claim 31, wherein the apertures are formed to have a length of 40 to 250 mm and a width of 5 to 80 mm.

34. The method as claimed in claim 33, wherein the apertures have a length of 50 to 200 mm and a width of 5 to 50 mm.

35. The method as claimed in claim 28, wherein the stretching in step (a) is effected in a single direction to provide a geogrid precursor in which the polymeric material is uniaxially orientated.

36. The method as claimed in claim 35, wherein, in step (a), the polymeric starting sheet is stretched to a stretch ratio of at least 4:1.

37. The method as claimed in claim 36, wherein said stretch ratio is at least 7:1.

38. The method as claimed in claim 37, wherein said stretch ratio is from 7:1 to 12:1.

39. The method as claimed in claim 35, wherein the apertures are formed such that the elongate tensile elements extend parallel to the stretching direction and the apertures are elongate and also extend parallel to the stretching direction.

40. The method as claimed in claim 39, wherein the apertures are formed such that the mesh structure produced in step (b) comprises:
  (i) a plurality of the elongate tensile elements extending parallel to each other, and
  (ii) a plurality of connector elements integral with the elongate tensile elements and each serving to connect adjacent elongate tensile elements together, the connector elements connecting any two of the elongate tensile elements being spaced from each other in the stretching direction thereby defining, with the elongate tensile elements, the elongate apertures.

41. The method as claimed in claim 40, wherein the apertures are formed such that the connector elements are arranged as a plurality of sets in which the connector elements of any one set are aligned with each other in a direction transverse to the elongate tensile elements, and wherein the sets are spaced from each other in the longitudinal direction of the elongate tensile elements.

42. The method as claimed in claim 40, wherein the apertures are formed such that the elongate tensile elements have a width of 2 to 50 mm, the apertures have a length 40 to 400 mm and a width of 5 to 100 mm, and the connector elements have a width as measured in the longitudinal direction of the elongate tensile elements of 2 to 20 mm.

43. The method as claimed in claim 42, wherein the elongate tensile elements have a width of 5 to 40 mm, the apertures have a length of 40 to 250 mm and a width of 10 to 80 mm, and the connector elements have a width of 6 to 18 mm.

44. The method as claimed in claim 39, wherein the apertures are formed such that the interconnecting mesh defining elements produced in step (b) comprises:
  (i) the elongate tensile elements comprising a plurality of generally parallel rib structures extending in the direction of uniaxial orientation, and (ii) a plurality of spaced, generally parallel bar structures extending transversely to the rib structures, said rib structures and said bar structures being interconnected by junctions at spaced locations along their respective lengths whereby the rib structures are sub-divided along their lengths into alternating junctions and rib segments, and the bar structures are sub-divided along their lengths into alternating bar segments and junctions.

45. The method as claimed in claim 44, wherein the apertures are formed such that the rib structures have a width of 2 to 50 mm, the apertures have a length of 40 to 400 mm and a width to 5 to 100 mm, and the bar structures have a width as measured in a longitudinal direction of the rib structures of 2 to 20 mm.

46. The method as claimed in claim 45, wherein the rib structures have a width of 5 to 40 mm, the apertures have a length of 40 to 250 mm and a width of 10 to 80 mm, and the bar structures have a width of 6 to 18 mm.

47. The method as claimed in claim 39, wherein the apertures are provided by a punching operation.

48. The method as claimed in claim 47, wherein the punching operation forms integral beads of a polymeric material that comprises the geogrid on a face of the geogrid and at least partly around peripheral edges of the apertures.

49. The method as claimed in claim 48, wherein the beads are formed along ends of the apertures and reduce to zero height along the elongate edges thereof.

50. The method as claimed in claim 28, wherein the elongate polymeric starting sheet is stretched in two mutually perpendicular directions to produce a geogrid precursor in which the polymeric material is biaxially orientated.

51. A geogrid comprising:
  a geogrid produced by the method as claimed in claim 28.

52. A method of producing a geogrid, the method comprising the steps of:
  (a) providing a geogrid precursor as a polymeric starting sheet comprising polymeric material uniformly molecularly orientated throughout an extent of the sheet, the geogrid precursor being of essentially uniform thickness and having a thickness of 0.1 to 3 mm, and
  (b) converting the geogrid precursor into a geogrid by forming apertures in the geogrid precursor to define an integral mesh structure formed of interconnecting mesh defining elements including elongate tensile elements, the molecular orientation of the integral mesh structure being uniform throughout an extent thereof.

\* \* \* \* \*